United States Patent
Kodama et al.

(10) Patent No.: US 7,628,502 B2
(45) Date of Patent: Dec. 8, 2009

(54) LIGHT CONTROLLING SHEET AND SURFACE LIGHT SOURCE DEVICE

(75) Inventors: Daijiro Kodama, Shinjuku-Ku (JP);
Masahiro Goto, Shinjuku-Ku (JP);
Wataru Tokuhara, Shinjuku-Ku (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 250 days.

(21) Appl. No.: 11/522,844

(22) Filed: Sep. 18, 2006

(65) Prior Publication Data

US 2007/0076406 A1    Apr. 5, 2007

(30) Foreign Application Priority Data

| Sep. 22, 2005 | (JP) | ............................... 2005-276157 |
| Oct. 19, 2005 | (JP) | ............................... 2005-304371 |
| Nov. 7, 2005 | (JP) | ............................... 2005-322043 |
| Nov. 18, 2005 | (JP) | ............................... 2005-333546 |
| Dec. 22, 2005 | (JP) | ............................... 2005-370051 |

(51) Int. Cl.
*G09F 13/04* (2006.01)

(52) U.S. Cl. .................. 362/97.1; 362/330; 362/561; 362/606; 362/619; 385/12; 385/32; 385/33; 385/74; 385/129

(58) Field of Classification Search ............... 362/97, 362/311, 330, 511, 551, 561, 606, 607, 610, 362/616, 619, 620, 625, 628, 97.1, 97.2, 362/97.3, 311.01, 311.02, 311.06, 311.09, 362/311.1, 311.12; 385/12, 32, 33, 74, 129
See application file for complete search history.

(56) References Cited

U.S. PATENT DOCUMENTS

| 7,153,017 | B2 * | 12/2006 | Yamashita et al. ........... 362/606 |
| 2001/0002165 | A1 * | 5/2001 | Shinohara et al. ............. 362/31 |
| 2001/0012078 | A1 | 8/2001 | Hira et al. |
| 2001/0015780 | A1 | 8/2001 | Yamaguchi |
| 2005/0270654 | A1 * | 12/2005 | Goto et al. ................... 359/626 |
| 2005/0280756 | A1 * | 12/2005 | Kim et al. .................... 349/114 |

FOREIGN PATENT DOCUMENTS

| EP | 0911654 A1 * | 4/1999 |
| JP | 08-095038 A1 | 4/1996 |
| JP | 11338394 A * | 5/1998 |
| JP | 10-241434 A1 | 9/1998 |
| JP | 2000-284268 A1 | 10/2000 |
| JP | 2005-148440 A1 | 6/2005 |
| JP | 2005-221619 A1 | 8/2005 |
| KR | 2001-0076359 A1 | 8/2001 |

\* cited by examiner

*Primary Examiner*—Sharon E Payne
*Assistant Examiner*—Mary Zettl
(74) *Attorney, Agent, or Firm*—Burr & Brown

(57) ABSTRACT

A light controlling sheet is provided in a surface light source device including a light source portion. The light controlling sheet includes an outgoing light side lens portion having multiple unit lenses arranged to project toward the outgoing light side, and transparent portions and reflecting portions provided on the incident light side. The transparent portions and the reflecting portions are arranged alternately, and the transparent portions comprise 40% to 60% of the total area of the light controlling sheet when viewed form a direction orthogonal to the sheet surface on the incident light side.

31 Claims, 19 Drawing Sheets

LIGHT CONTROLLING SHEET AND SURFACE LIGHT SOURCE DEVICE

BACKGROUND OF THE INVENTION

1. Field of the Invention

The present invention relates to a light controlling sheet and a surface light source device for use in illumination of a liquid crystal device.

2. Background Art

As the light controlling sheet, a sheet on which rectangular prisms are arranged in larger numbers is known.

In such a sheet on which rectangular prisms are arranged, however, light tends to be radiated in an unduly wider range of the outgoing angular direction.

As used herein, the terms "incident light" and "outgoing light" are intended to mean angles relative to a sheet surface (a surface when viewed as the entire surface of a light controlling sheet), and express angles each defined by the normal line of the sheet surface and the direction along which light travels, respectively.

To prevent light from being radiated in such an unduly wider range of the outgoing angular direction, examples in which a lens is provided on the outgoing light side while a shielding portion corresponding to the lens on the outgoing light side is arranged on the incident light side are described in Patent Documents 1 to 4.

However, even in the cases of the lens sheets described in Patent Documents 1 to 4, unless the lens and the shielding portion are formed in an appropriate form, a great amount of light may be generated that can be radiated in an unduly wide range of the outgoing angular direction, thus deteriorating the utilization efficiency of light.

Any of the lens sheets described in Patent Documents 1 to 4 has a flat surface on its incident light side. Therefore, when it is superimposed on a separate optical sheet having a flat surface, Newton rings may tend to occur.

Attempting to make the utilization efficiency of light higher, only the utilization of the lens on the outgoing light side and the shielding portion on the incident light side may significantly restrict the effect. Accordingly, such systems can not satisfy the need to achieve a satisfactorily higher level of light utilization.

Furthermore, the shielding portion provided on the incident light side requires critically accurate alignment relative to the position of the lens on the outgoing light side, thus making its formation significantly difficult.

Patent Document Cited:
Patent Document 1: TOKUKAIHEI No. 8-95038, KOHO
Patent Document 2: TOKUKAIHEI No. 10-241434, KOHO
Patent Document 3: TOKUKAI No. 2000-284268, KOHO
Patent Document 4: TOKUKAI No. 2005-221619, KOHO

SUMMARY OF THE INVENTION

An object of the present invention is to provide a light controlling sheet and a surface light source device, which can condense illuminating light efficiently into a desired area.

Another object of the present invention is to provide a light controlling sheet and a surface light source device, which do not generate Newton rings, and can provide good productivity.

According to a first aspect of the present invention, a light controlling sheet is provided in a straight-down type surface light source device including a light source portion, having a sheet surface, and adapted to uniformalize and/or condense light coming from the light source portion, the light controlling sheet comprising: an outgoing light side lens portion having multiple unit lenses arranged to project toward the outgoing light side; transparent portions provided on the incident light side; and reflecting portions comprising some areas other than the transparent portions on the incident light side; wherein the transparent portions are adapted to transmit light coming from the light source portion, while the reflecting portions are adapted to reflect light coming from the light source portion, and the transparent portions and the reflecting portions are arranged alternately, and the transparent portions comprise 40% to 60% of the total area of the light controlling sheet when viewed from a direction orthogonal to the sheet surface on the incident light side.

According to a second aspect of the present invention, when assuming that a pitch of the arrangement of the unit lenses of the outgoing light side lens portion is P, a thickness from the surface of the transparent portions to the apex of the unit lenses of the outgoing light side lens portion is t, and an average refractive index of a material forming the light controlling sheet is n, the following relationship can be satisfied:

$$\sin^{-1}(1/n) \leq \tan^{-1}(P/t).$$

According to a third aspect of the present invention, each unit lens of the outgoing light side lens portion is formed such that the unit lens is a part of an elliptical cylinder whose major axis is orthogonal to the sheet surface, or a part of a part of a spheroid whose major axis is orthogonal to the sheet surface.

According to a fourth aspect of the present invention, the semi-major axis of each unit lens of the outgoing light side lens portion is in the range of from 1.5 times to 3.0 times its semi-minor axis.

According to a fifth aspect of the present invention, an incident light side lens portion having a lens shape which projects toward the incident light side is formed in each transparent portion.

According to a sixth aspect of the present invention, when assuming that the pitch of the arrangement of the unit lenses of the outgoing light side lens portion is P, the thickness from the surface of the transparent portions to the apex of the unit lenses of the outgoing light side lens portion is t, the average refractive index of the material forming the light controlling sheet is n, an angle defined between a tangent obtained at the lens surface of the incident light side lens portion at one end of each transparent portion and the sheet surface is θ, and an opening ratio which is an area ratio of the transparent portion is R, the following relationship can be satisfied:

$$\sin^{-1}(1/n) - \theta \leq \tan^{-1}\{(2-R) \times 0.5 \times P/(t-h)\}.$$

According to a seventh aspect of the present invention, when assuming that the pitch of the arrangement of the unit lenses of the outgoing light side lens portion is P, the thickness from the surface of the transparent portions to the apex of the unit lenses of the outgoing light side lens portion is t, the average refractive index of the material forming the light controlling sheet is n, and the opening ratio which is an area ration of the transparent portion is R, the following relationship can be satisfied:

$$\sin^{-1}(1/n) \leq \tan^{-1}\{(2-R) \times 0.5 \times P/t\}.$$

According to an eighth aspect of the present invention, the reflecting portions project toward the incident light side as compared with the transparent portions.

According to a ninth aspect of the present invention, the reflection portions are formed by printing or transferring.

According to a tenth aspect of the present invention, a concave-convex shape comprising multiple convex portions and multiple concave portions each being interposed between each adjacent pair of the convex portions is provided on the incident light side, and an apex of each unit lens and a central portion of each corresponding concave portion are located at positions such that they are aligned with each other when vied from a direction orthogonal to the sheet surface, and wherein the reflecting potions are formed on each convex portion.

According to an eleventh aspect of the present invention, the projecting amount of each convex portion from each concave portion is within the range of from 5 µm to 60 µm.

According to a twelfth aspect of the present invention, the reflecting portions are adapted to provide diffusion reflection of light.

According to a thirteenth aspect of the present invention, the unit lenses, the convex portions and the concave portions are integrally formed.

According to a fourteenth aspect of the present invention, when assuming that the surface area of the incident light side is Si, and the surface area of the outgoing light side is So, the following relationship can be satisfied:

$0.8 < Si/So < 1.2.$

According to a fifteenth aspect of the present invention, a ridgeline around the boundary between each convex portion and the adjacent concave portion is a gently curved face, and wherein the reflecting portion is also formed on each curved face at the ridgeline.

According to a sixteenth aspect of the present invention, each concave portion is of a shape including a curved face projecting toward the incident light side.

According to a seventeenth aspect of the present invention, the curved face shape of each concave portion is formed such that an angle defined between a tangent obtained around its central portion and the sheet surface is a relatively small angle, while an angle defined between a tangent obtained at a position closer to each adjacent convex portion and the sheet surface is a relatively large angle.

According to a eighteenth aspect of the present invention, the curved face shape of each concave portion is a shape of a part of an elliptical cylinder.

According to a nineteenth aspect of the present invention, an apex of each unit lens and a central portion of each corresponding convex portion are located at positions such that they are aligned with each other when viewed from a direction orthogonal to the sheet surface, and the reflecting portion is formed on each concave portion.

According to a twentieth aspect of the present invention, the depth of the concave portions from the convex portions is within the range of 5 µm to 60 µm.

According to a twenty-first aspect of the present invention, the width on the outgoing light side of each concave portion is narrower than the width on the incident light side thereof.

According to a twenty-second aspect of the present invention, a water-repellent layer is formed on each convex portion.

According to a twenty-third aspect of the present invention, each convex portion is of a shape including a curved face projecting toward the incident light side.

According to a twenty-fourth aspect of the present invention, the curved face shape of each convex portion is formed such that an angle defined between a tangent obtained around its central portion and the sheet surface is a relatively small angle, while an angle defined between a tangent obtained at a position closer to the adjacent convex portion and the sheet surface is a relatively large angle.

According to a twenty-fifth aspect of the present invention, the curved face shape of each concave portion is a shape of a part of an elliptical cylinder.

According to a second embodiment of the present invention, a surface light source device is provided, adapted to illuminate a transmission-type display portion from the back side, which includes a light source portion including a plurality of light sources, and a light controlling sheet adapted to uniformalize and/or condense light coming from the light source portion and having a sheet surface, the light controlling sheet comprising: an outgoing light side lens portion having multiple unit lenses arranged to project toward the outgoing light side; transparent portions provided on the incident light side; and reflecting portions comprising areas other than the transparent portions on the incident light side; wherein the transparent portions are adapted to transmit light coming from the light source portion, while the reflecting portions are adapted to reflect light coming from the light source potion, the transparent portions and the reflecting portions are arranged alternately, and the transparent portions comprise 40% to 60% of the total area of the light controlling sheet when viewed from a direction orthogonal to the sheet surface on the incident light side.

According to a first aspect of the second embodiment, the light controlling sheet mainly controls light traveling along the vertical direction on a screen of a transmission-type display portion in use.

According to a second aspect of the second embodiment, the surface light source device further comprises a diffusion sheet having a light diffusing property.

According to a third aspect of the second embodiment, the surface light source device further comprises a second light controlling sheet adapted to mainly control light traveling along a direction orthogonal to the direction along which the light controlling sheet controls light mainly.

According to a fourth aspect of the second embodiment, particles having a light diffusing property are added to at least one of the sheets contained in the surface light source device.

According to a fifth aspect of the second embodiment, a highly rigid sheet having a rigidity higher than that of the light controlling sheet is provided on the light source side of the light controlling sheet.

According to a sixth aspect of the second embodiment, the light controlling sheet is joined at its reflecting portions to the highly rigid sheet.

DETAILED DESCRIPTION OF THE INVENTION

EXAMPLES

First embodiment

Both the purpose of condensing illuminating light into a desired area with high efficiency and the purpose of enhancing the productivity was realized by optimizing the relationship between shapes of lenses and dimensions of reflecting portions respectively provided on the outgoing light side and the incident light side.

Example

Figure 1:
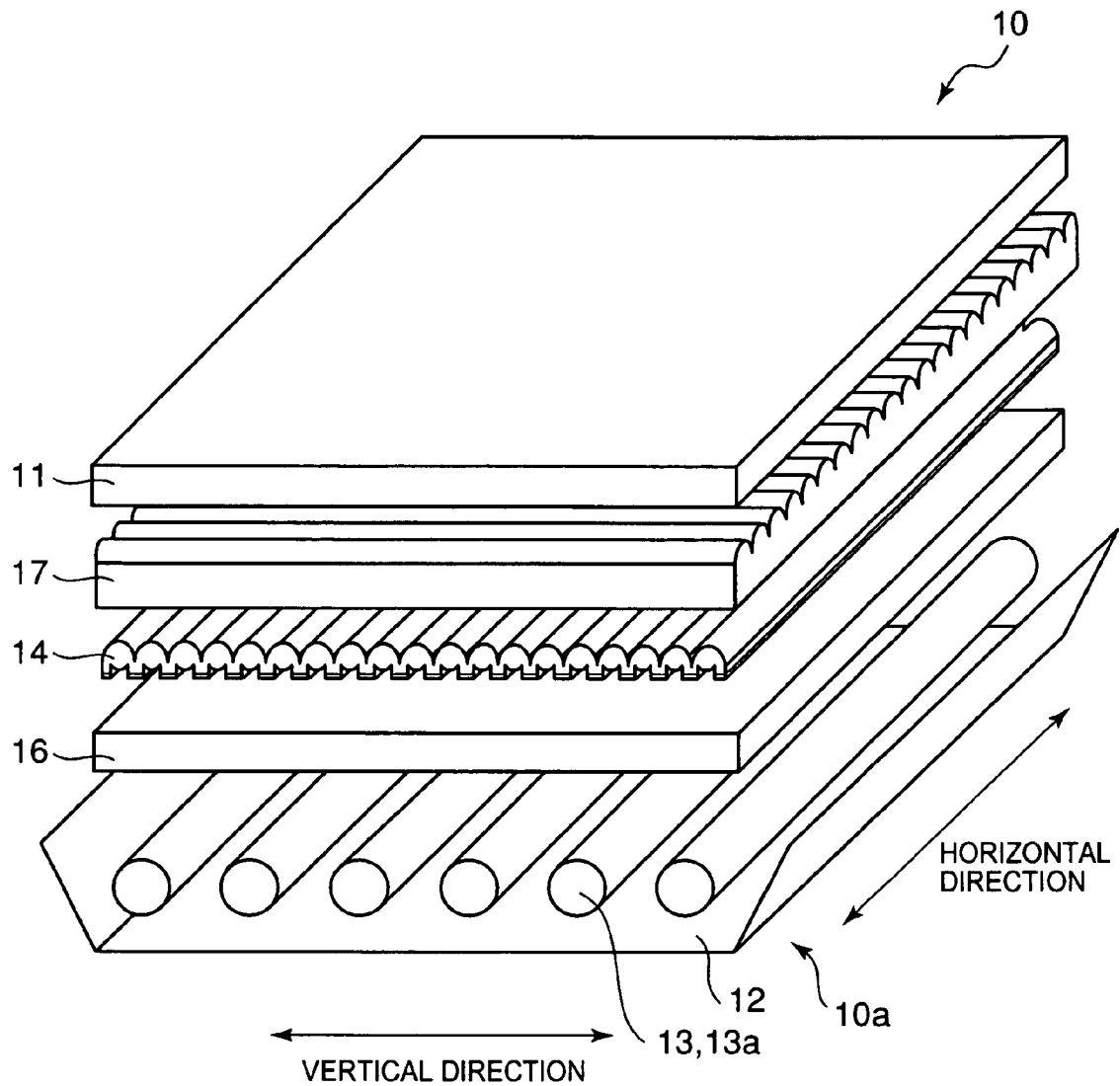
FIG. 1 is a diagram showing one example of a transmission-type display device including a surface light source device according to a first embodiment of the present invention.

FIG. 1 is a diagram showing one example of a transmission-type display device including a surface light source portion according to a first embodiment of the present invention.

The drawings described below, including FIG. 1, respectively show typical expressions, and hence emphasize, appropriately, sizes and/or shapes of respective portions in order to facilitate understanding.

A transmission-type display device 10 according to this embodiment comprises an LCD (Liquid Crystal Display) panel 11, a reflecting plate 12, emission tubes 13, a light controlling sheet 14, an opal plate 16, and a second light controlling sheet 17, wherein image information to be formed on the LCD panel 11 is displayed by illumination provided from the back side. A surface light source device 10a for illuminating the LCD panel 11 from the back side is composed of the reflecting plate 12, emission tubes 13, light controlling sheet 14, opal plate 16 and second light controlling sheet 17.

The LCD panel 11 is formed of a transmission-type liquid crystal display element, constituting a transmission-type displaying portion which has a 30-inch size and is adapted for 800×600 dot display. For the LCD panel 11, the direction along the longitudinal direction of the emission tubes 13 is regarded as the horizontal direction while the direction along which the emission tubes are arranged is regarded as the vertical direction.

The emission tubes 13 are cold-cathode tubes of a linear light source type for forming a light source portion 13a as a back light. In this embodiment, six emission tubes 13 are arranged in parallel at an approximately 75 mm equal interval. On the back side of the emission tubes 13, a reflecting plate 12 is provided.

The reflecting plate 12 is provided over the whole surface of the emission tubes 13 (on the back side) opposite to the light controlling sheet 14, and is adapted to reflect illuminating light traveling toward the back face side, by diffuse reflection, and direct it toward the light controlling sheet 14 (in the outgoing light direction), thus approximating the illuminance of the incident light into a uniformed state.

The opal plate 16 is a diffusion sheet having a non-directional light diffusing property, and is disposed on the light source side of the light controlling sheet 14. The opal plate 16 employed in this embodiment is a highly rigid sheet having a deformation strength against flexure (flexural strength) and a deformation strength against torsion (torsional rigidity), both being higher than those of the light controlling sheet 14. The light controlling sheet 14 is adhered to the opal plate 16, at its reflecting portions 144, via an adhesive layer (not shown). In this way, the opal plate 16 can be reinforced by the light controlling sheet 14. However, if the light controlling sheet 14 itself is sufficiently strong, the opal plate 16 may not be necessarily provided.

The second light controlling sheet 17 is a lenticular lens sheet which is provided between the light controlling sheet 14 and the LCD panel 11. On the outgoing light side of the second light controlling sheet 17, unit lenses are arranged in large numbers. The unit lenses of the second light controlling sheet 17 are arranged in the horizontal direction, and a primary direction along which light is controlled by the sheet 17 is the horizontal direction. Accordingly, the second light controlling sheet 17 is adapted to control light in the horizontal direction which is orthogonal to a primary direction (the vertical direction) along which light is controlled by the light controlling sheet 14 described below.

Figure 2:
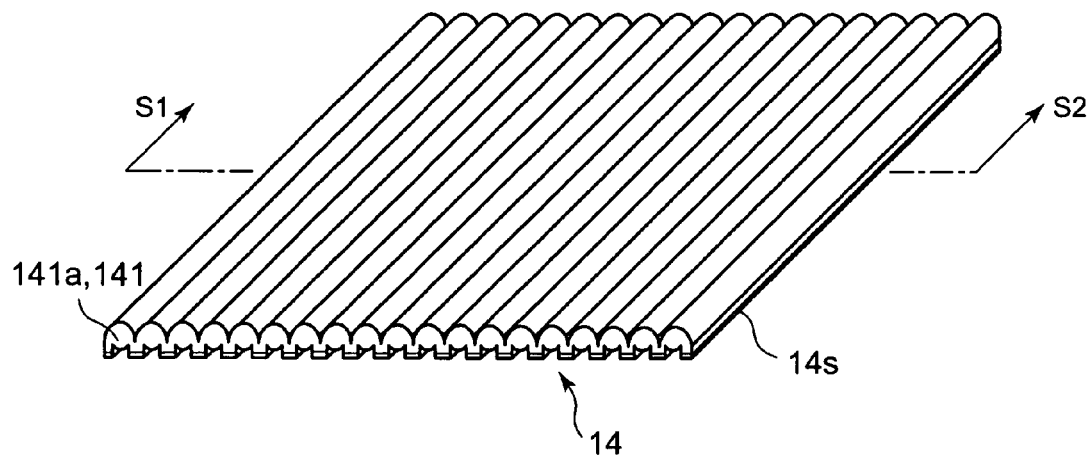
FIG. 2 is a perspective view showing a light controlling sheet.
Figure 3:
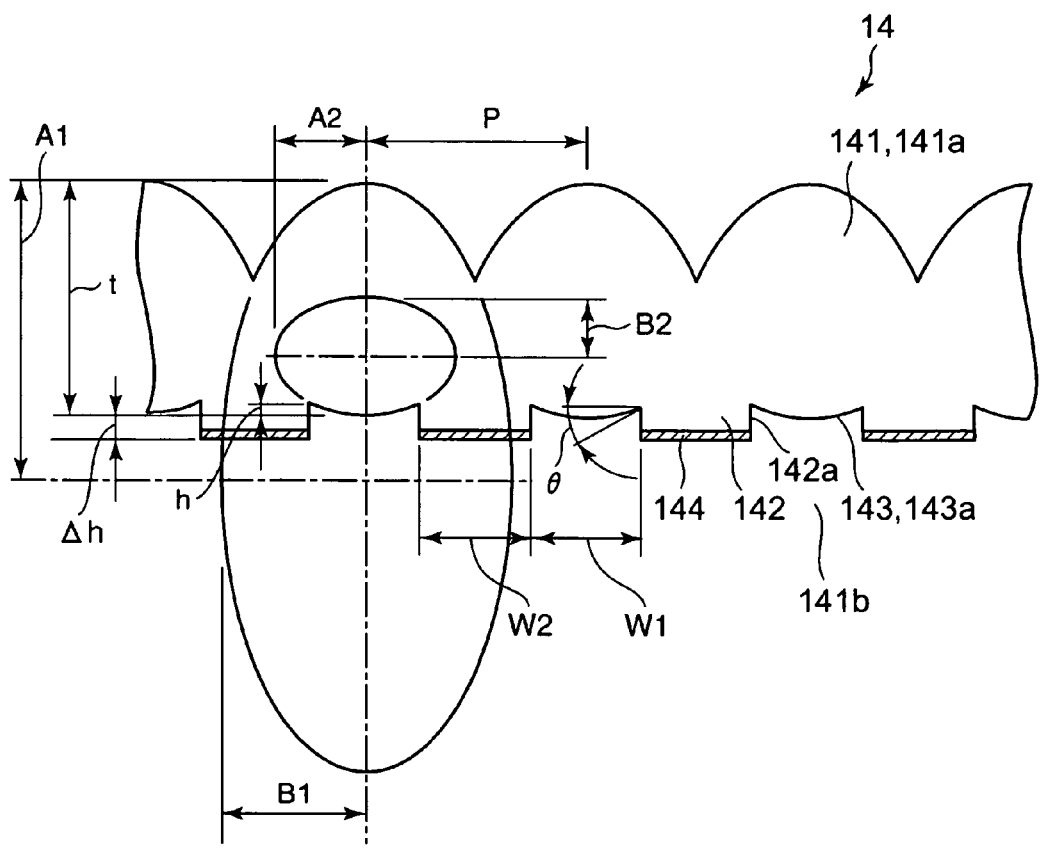
FIG. 3 is a cross section of the light controlling sheet taken along line S1-S2 designated by arrows in FIG. 2.

FIGS. 2 and 3 are diagrams showing the light controlling sheet 14, respectively.

The light controlling sheet 14 has a sheet surface 14S and is adapted to reduce uneven brightness of light emitted from the emission tubes 13 and condense outgoing light into a desired range of the outgoing angle. The light controlling sheet 14 comprises outgoing light side lens portions 141a including multiple unit lenses 141 provided on the outgoing light side and adapted to condense and radiate light, and transparent portions 143 (also referred to as optically transparent portions) and reflecting portions 144, both provided on the incident light side. Each unit lens 141 has a shape constituting a part of continuous elliptical cylinders. In the surface on the outgoing light side of the light controlling sheet 14, the unit lenses 141 are arranged in parallel with one another in large numbers. The direction along which the unit lenses 141 are arranged is coincident with the direction along which the emission tubes 13 are arranged (see FIG. 1).

The light controlling sheet 14 of this example is integrally molded by extrusion molding, using a clear MS resin (a copolymer resin comprising a styrene-acryl resin and a styrene resin) having an average refractive index of 1.53.

In this way, the shaping on both sides at the same time utilizing the extrusion method for molding the light controlling sheet 14 can enhance the productivity. Since both the incident light side and outgoing light side of the light controlling sheet 14 are formed with the same material, the moisture absorption and/or coefficient of linear expansion becomes equal. Thus, even under changes of temperature and humidity, both the incident light side and outgoing light side will exhibit the same behavior. Therefore, there will be no occurrence of conspicuous deformation or warp only on one side, thereby enhancing resistance to changes of environment.

It should be noted that the light controlling sheet 14 is not limited to the MS resin, but other thermoplastic resins having proper optical transparency may be optionally selected and used. Alternatively, the light controlling sheet 14 may be produced by using a photo-curing resin, such as ultraviolet-ray curable resins and ionizing-radiation curable resins.

FIG. 3 is a cross section of the light controlling sheet 14 taken along line S1-S2 designated by arrows in FIG. 2. In FIG. 3, the upper side represents the outgoing light side.

Each unit lens 141 is an outgoing light side lens portion formed of a part of an elliptical cylinder portion having a semi-major axis A1 of 400 μm and a semi-minor axis B1 of 200 μm, and is arranged with a pitch of 300 μm, with the major axis being orthogonal to the sheet surface 14s of the light controlling sheet 14.

On the incident light side of the light controlling sheet 14, concavo-convex portions 141b are formed, including multiple convex portions 142 and concave portions 143 each interposed between each adjacent pair of the convex portions 142. On each of the convex portions 142, a reflecting portion 144 is provided, and each concave portion 143 constitutes a transparent portion adapted to transmit light.

Each convex portion 142 is provided such that its projecting amount Δh, measured from an apex of each concave portion 143 to the surface of each reflecting portion 144, becomes 30 μm, and its width W2 is 171 μm.

Each concave portion 143 is interposed between the adjacent pair of convex portions 142, and serves as a transparent portion which is able to transmit light.

Each concave portion 143 is disposed, with a width W1 of 129 μm, at a position such that its center would be aligned with on an apex of a unit lens 141 when viewed in the direction of the normal line to the sheet surface 14S, i.e., in the direction orthogonal to the sheet surface 14S, and has a curved shape projecting toward the incident light side. The concave portions 143 comprise 43% of the total area of the light controlling sheet 14 when viewed along the normal line from the incident light side. The area ratio that the concave portions comprise, when viewed along the direction orthogonal to the sheet surface 14S on the incident light side, is herein referred to as an opening ratio R.

The curved shape of each concave portion 143 of this embodiment forms an incident light side lens portion 143a which constitutes a part of an elliptical cylinder portion having a semi-major axis A2 of 100 μm and a semi-minor axis B2 of 50 μm, and the height h of the lens portion 143a is 5 μm, with the major axis being parallel to the sheet surface of the light controlling sheet 14. The angle θ defined by a tangent of the lens surface at one end of each concave portion 143 and the sheet surface 14s is 20°.

The distance t between an apex of one unit lens 141 and an apex of the lens shape of a corresponding concave portion 143 is 430 μm.

Each reflecting portion 144 is formed on the incident-light-side surface of each convex portion 142 and serves as a diffusion reflecting surface for reflecting illuminating light by diffusion reflection. Each convex portion 142 has side faces 142a. The reflecting portions 144 of this embodiment are formed by printing white color ink containing titanium oxide as a pigment on the respective incident-light-side surfaces of the convex portions. When using the white color ink, light which is not reflected will be transmitted by diffusion, thus the utilization efficiency of light can be enhanced. However, for the reflecting portions 144, if employing reflecting surfaces formed from aluminum or silver rather than using the diffusion reflecting surfaces formed with white color ink or the like, some amount of light will be absorbed, thus degrading the utilization efficiency of light. Also, if employing such metals, blackening or deterioration of reflectance may occur due to oxidization, thus an overcoat or the like must be required to prevent such phenomena, leading to increase of the production cost. Accordingly, it is preferred that the reflecting portions 144 are composed of diffusion reflecting surfaces formed with white color ink or the like. It is noted that the reflecting portions 144 may be formed by transferring rather than printing.

Preferably, the light controlling sheet 14 can satisfy the following conditions.

(Condition 1)

The area ratio (opening ratio) for the transparent portions corresponding to the concave portions 143, when viewed along the normal line direction toward the incident light side, is in the range of from 40% to 60%. This is preferable to prevent the condensing property from being degraded by oblique outgoing light which comes in a unit lens 141 obliquely at a flat portion around its apex and then comes out from the unit lens 141, or by oblique outgoing light which has been totally reflected at one end of a unit lens 141 and is then refracted on the opposite side of the unit lens 141. If the width of each convex portion 142 (reflecting portion 144) is excessively widened, the optical transmission of the light controlling sheet 14 is extremely decreased, thus degrading the utilization efficiency of light. Therefore, it is preferable to set the area ratio at 40% or higher.

TABLE 1

|  | Opening ratio (%) | | | | |
| --- | --- | --- | --- | --- | --- |
|  | 70 | 60 | 50 | 40 | 30 |
| Front brightness | NPU | PU | A | EX | EX |
| Viewing angle | EX | EX | A | PU | NPU |

EX: excellent,
A: adequate,
PU: possible to use,
NPU: not possible to use

'Table 1 shows a relationship between the opening ratio, front brightness and viewing angle.

If the opening ratio is smaller than 40%, the viewing angle becomes too narrow and thus not applicable. If the opening ratio is larger than 60%, the front brightness becomes too low and thus not applicable. Accordingly, it is desirable that the opening ratio is within the range of from 40% to 60%.

In this embodiment, the concave portions 143 comprise together an area corresponding to the opening ratio of 43%, and satisfy the condition 1 described above.

(Condition 2)

For the light controlling sheet 14, when assuming that a pitch of unit lenses 141 is P, a thickness from the surfaces of the optically transparent portions 143 to the apexes of the unit lenses 141 is t, and a refractive index of a material of the light controlling sheet is n, it is desirable to satisfy the following relationship.

$$\sin^{-1}(1/n) \leq \tan^{-1}(P/t)$$

If the light controlling sheet 14 can satisfy this condition, it can be prevented that light which comes in a central portion of a concave portion 143 and then travels toward one unit lens 141 adjacent to another unit lens 141 which is located at a position to be superimposed on that concave portion 143 will come out as it has traveled.

Figure 4:
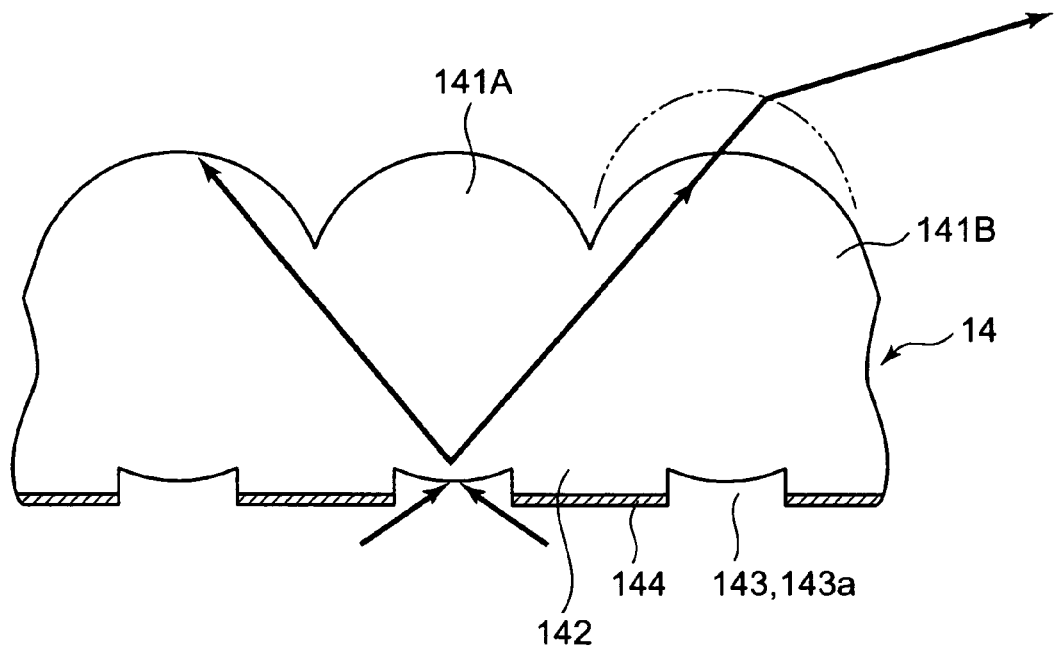
FIG. 4 is a diagram illustrating a condition 2.

FIG. 4 is a diagram illustrating the condition 2.

If the distance t from the unit lenses 141 and apexes of lens shapes of the concave portions 143 is too large, the condition 2 can not be satisfied, and thus the possibility that light which comes in a central portion of a concave portion 143 and then travels toward one unit lens 141B (hereinafter referred to as an adjacent unit lens) adjacent to another unit lens 141A which is located at a position to be superimposed correspondingly on the concave portion 143 will come out, as it has traveled, becomes high.

However, if the condition 2 is satisfied, the light coming out from the adjacent unit lens 141B can be substantially reduced or eliminated.

In this embodiment, n is 1.53, P is 0.3 mm, and t is 0.33 mm. Substitution of these values into the above relationship exhibits that the condition 2 can be satisfied as follows.

$$\sin^{-1}(1/1.53) \leq \tan{-1}(0.3/0.33)$$

$$40.8° \text{ (the left side)} \leq 42.3° \text{ (the right side)}$$

(Condition 3)

It is preferred that the semi-major axis of each unit lens 141 of the outgoing light side lens portion 141a of the light controlling portion 14 is 1.5 times to 3.0 times the semi-minor axis thereof. By satisfying this condition, the effect of condensing light can be further enhanced. If the semi-major axis is less than 1.5 times the semi-minor axis, the light condensing property can not be provided, while if larger than 3.0 times, total reflection will occur and light outgoing at an unduly large outgoing angle will be increased.

If the semi-major axis is greater than 3.0 times the semi-minor axis, light outgoing from an adjacent lens is increased even though the opening rate is as much as 50%, thus increasing the brightness seen in an oblique direction (direction of a larger outgoing angle) and hence causing degradation of contrast.

In this embodiment, each unit lens 141 has a semi-major axis A1 of 400 μm and a semi-minor axis B1 of 200 μm, thus satisfying the condition 3.

(Condition 4)

For the light controlling sheet 14, when assuming that the height of the incident light side lens portion is h, an angle defined between the normal line of the incident light side lens surface at one end of each transparent portion 143 and the sheet surface is θ, and the opening ratio is R, it is desirable to satisfy the following relationship.

$$\sin^{-1}(1/n) - \theta \leq \tan^{-1}\{(2-R) \times 0.5 \times P/(t-h)\}$$

Satisfying this condition can prevent that light which comes in one end of a concave portion 143 and then travels toward one unit lens 141 adjacent to another unit lens 141 which is located at a position to be superimposed correspondingly on the concave portion 143 will come out from a central portion (around an apex) of that one unit lens 141.

(Condition 5)

In each of the transparent portions 143, the outgoing light side lens portion is not necessarily formed, and each transparent portion 143 may be formed to be flat.

In this case, for the light controlling sheet 14 having the opening rate R, it is desirable to satisfy the following relationship.

$$\sin^{-1}(1/n) \leq \tan^{-1}\{(2-R) \times 0.5 \times P/t\}$$

Figure 5:
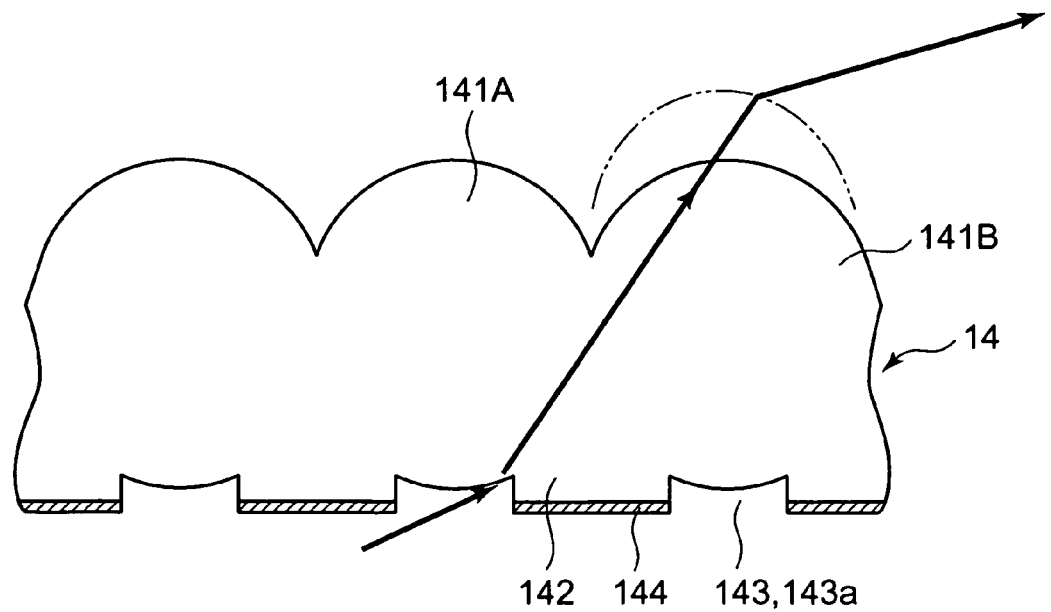
FIG. 5 is a diagram illustrating a condition 4.

FIG. 5 illustrates the condition 4, which is referred to again.

If the distance t from the unit lenses 141 and the apexes of lens shapes of the concave portions 143 becomes too large, the condition 4 can not be satisfied, and thus the possibility that light which comes in a concave portion 143 and then travels toward an adjacent unit lens 141B will come out, as it has traveled, becomes high.

However, if the condition 4 is satisfied, the light coming out from the adjacent unit lens 141B can be substantially reduced or eliminated.

In this embodiment, n is 1.53, θ is 20°, R is 43%, P is 0.3 mm, t is 0.33 mm, and h is 0.005 mm. Substitution of these values into the above relationship exhibits that the condition 4 can be satisfied as follows.

$$\sin^{-1}(1/1.53) - 20° \leq \tan-1\{(2-0.43) \times 0.5 \times 0.3/(0.33-0.005))$$

$$20.8° \text{ (the left side)} \leq 42.3° \text{ (the right side)}$$

Figure 6:
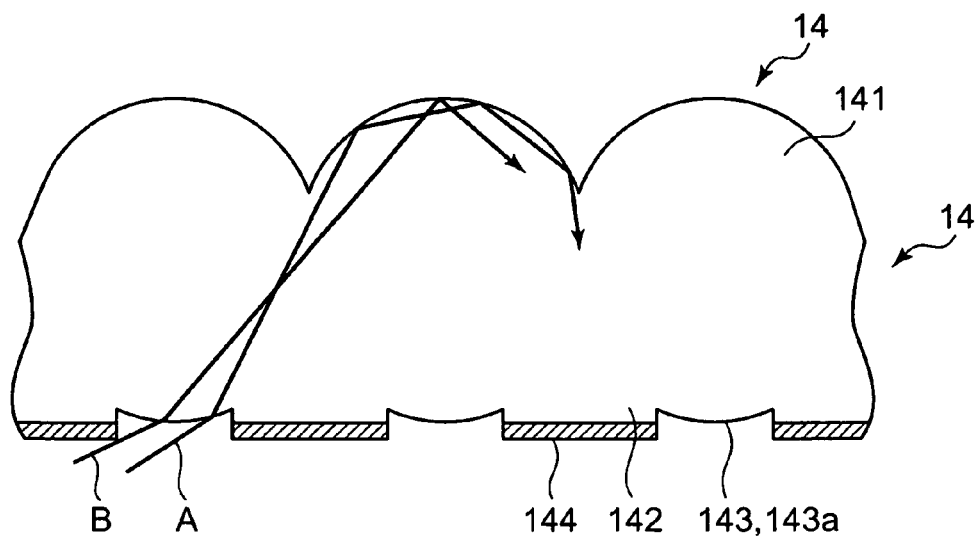
FIG. 6 is a diagram illustrating ways of travel of light which comes in the light controlling sheet of this example, at a large incident angle.

FIG. 6 is a diagram illustrating ways of travel of light which comes in the light controlling sheet 14 of this example, at a large incident angle.

Light A satisfies the condition 1, thus being reutilized without outgoing in an oblique direction from an adjacent unit lens 141.

Light B satisfies the conditions 2, 3, thus being also reutilized, after having been returned toward the light source, without outgoing from a central portion of the unit lens 141.

In order to confirm the effect of this embodiment, comparison with a comparative surface light source device was performed, on which a brightness rising film (BFE, produced by Sumitomo-3M Co., Ltd.) is provided wherein prism shapes each having an apex angle of 90 degrees are arranged in large numbers on the outgoing light side.

This assessment was performed by arranging the light controlling sheet 14 alone on the emission tubes 13 and alternately by arranging the comparative sheet alone on the emission tubes 13.

For the light controlling sheet 14 of this embodiment, the diffusion mesial angle was approximately 30 degrees, exhibiting high condensing ability while radiating uniform illuminating light without uneven brightness.

On the other hand, for the comparative example, the diffusion mesial angle was approximately 40 degrees, unnatural rising of the brightness was found at the diffusion angle of 60 degrees or higher, and uneven brightness was also found.

In this embodiment, since the unit lenses 141 are arranged on the outgoing light side while the reflecting portions 144 adapted to perform diffuse reflection are provided on the incident light side, illuminating light can be condensed into a desired area efficiently without generating Newton rings even though being superimposed on the opal plate 16.

In addition, since the light controlling sheet 14 is integrally molded with the same material, and the surface areas of the sheet 14 both on the incident light side and on the outgoing light side are substantially the same, excellent resistance to changes of environment can be realized.

Furthermore, since the light controlling sheet 14 is integrally molded by extrusion molding and the reflecting portions 144 are formed on the convex portions 142 by printing, enhanced productivity can be provided.

Since the light controlling sheet 14 satisfies the conditions 1 to 4 described above to optimize dimensional relations of the lens shapes and reflecting portions and the like respectively provided on the incident light side and the outgoing light side, the light condensing ability can be enhanced, as well as, light to be radiated to a desired area can be increased.

(Variations)

Without being limited to the examples described above, various variations and modifications are possible to be made, and they are also within equivalent of the present invention.

(1) In this example, while an example of the surface light source device in which linear light sources are arranged in parallel has been illustrated and described, the example is not limited to this aspect, but may be a surface light source device employing point light sources.

(2) In this example, while an example of the light controlling sheet which is a lenticular lens sheet wherein unit lenses each having the same cross section and extending in one direction are arranged in large numbers has been described, the example is not limited to this aspect. For instance, a lens array (the so-called double cross grain patterned lens) sheet wherein unit lenses are arranged in two dimensional directions may be used as the light controlling sheet 14. Also, in this case, it is preferred to provide transparent portions in some areas each of which is superimposed on each unit lens when viewed in the normal line direction of the sheet as well as to provide the reflection portions in the other areas.

(3) In this example, while an example of the controlling sheet 14 wherein one sort of unit lenses are arranged on the outgoing light side has been described, the example is not limited to this aspect. For instance, many kinds of unit lenses may be arranged in combination on the outgoing light side.

(4) In this example, light diffusing particles for providing a proper light diffusing effect may be added to at least one of various optical sheets used in the surface light source device so as to adjust the light diffusing property.

According to the present invention, the following effects can be obtained.

(1) Since comprising the outgoing light side lens portion, the transparent portions having an opening rate comprising 40% to 60% of the total area, which is defined when viewed along the normal line direction on the incident light side, i.e., the direction orthogonal to the sheet surface, and the reflecting portions provided alternately relative to the transparent portions, it can be prevented that light which comes in obliquely will reach a flat portion around an apex of an outgoing light side lens portion and that light which comes in will experience total reflection at one end of an outgoing light side lens, thus condensing illuminating light adequately into a desired area with high efficiency.

(2) Since the light controlling sheet can satisfy the relationship: $\sin^{-1}(1/n) \leqq \tan^{-1}(P/t)$, it can be prevented that light which comes in a central portion of a transparent portion and then travels toward one outward outgoing light side lens portion adjacent to another outgoing light side lens portion which is located in a position to be correspondingly superimposed on the transparent will come out as it has traveled. Therefore, illuminating light can be condensed into a desired area with high efficiency.

(3) Since each unit lens of the outgoing light side lens portion is formed such that the unit lens is a part of an elliptical cylinder whose major axis is orthogonal to the sheet surface, or a part of a spheroid whose major axis is orthogonal to the sheet surface, the light controlling sheet can provide a higher light condensing effect while having a lens shape which is simple and can be produced with ease.

(4) Since the semi-major axis of each unit lens of the outgoing light side lens portion is in the range of from 1.5 times to 3.0 times its semi-minor axis, a higher light condensing effect can be obtained.

(5) Since the incident light side lens portion having a lens shape which projects toward the incident light side is formed in each transparent portion, even though light comes in with a wider range of the incident angle, it can be condensed into a desired area.

(6) Since the light controlling sheet can satisfy the relationship: $\sin^{-1}(1/n) - \theta \leqq \tan^{-1}\{(2-R) \times 0.5 \times P/(t-h)\}$, it can be prevented that light which comes in a transparent portion and then travels toward one outgoing light side lens portion adjacent to another outgoing light side lens portion which is located in a position to be correspondingly superimposed on the transparent portion will come out from a central portion (around an apex) of that one outgoing light side lens portion. Therefore, illuminating light can be condensed into a desired area with high efficiency.

(7) Since the light controlling sheet can satisfy the relationship: $\sin^{-1}(1/n) \leqq \tan^{-1}\{(2-R) \times 0.5 \times P/t\}$, it can be prevented that light which comes in a transparent portion and then travels toward one outgoing light side lens portion adjacent to another outgoing light side lens portion which is located in a position to be correspondingly superimposed on the transparent portion will come out from a central portion (around an apex) of that one outgoing light side lens portion. Therefore, illuminating light can be condensed into a desired area with high efficiency.

(8) Since the reflecting portions project toward the incident light side as compared with the transparent portions, the formation of the reflecting portions can be performed easier. This can also serve to prevent occurrence of Newton rings.

(9) Since the reflection portions are formed by printing or transferring, the formation of the reflecting portions can be performed with ease.

(10) Since the light controlling sheet can mainly control light traveling in the vertical direction relative to a screen of a transmission-type display device in use, thus efficiently condensing light spreading in the vertical direction and enhancing the front brightness. Because a horizontal viewing angle wider than a vertical viewing angle is desired in commonly available display devices, this light controlling sheet can be applied to such a kind of various display devices.

(11) Since at least one diffusion sheet having a light diffusing effect is provided, uneven brightness can be reduced.

(12) Since a second light controlling sheet for mainly controlling light in a direction orthogonal to the direction in which the light controlling sheet mainly controls light is also provided, control of an outgoing light range in both of vertical direction and horizontal direction can be performed.

(13) Since light diffusing particles for providing a proper light diffusing effect can be added to at least one of sheets used in the surface light source device, uneven brightness can be reduced.

(14) Since a highly rigid sheet having rigidity higher than that of the light controlling sheet is provided on the light source side of the light controlling sheet, the rigidity of the entire system can be enhanced even though the rigidity of the light controlling sheet itself is lower. Thus, a surface light source device with a higher flatness can be obtained.

(15) Since the light controlling sheet is joined to the highly rigid sheet at its reflecting portions, even though the rigidity of the light controlling sheet itself is lower, a surface light source device with a higher flatness can be obtained.

Second Embodiment

This embodiment is made by adding features which will be described below to the first embodiment shown in FIGS. 1 through 6, and the other parts of this embodiment are substantially the same as those described in the first embodiment.

Also, the area that the transparent portions on the incident light side comprise relative to the whole surface of the light controlling sheet is substantially the same as that in the first embodiment.

According to this embodiment, the principal objects to condense illuminating light into a desired area with high efficiency, enhance resistance to changes of environment and improve the productivity can be achieved by forming the shape on the incident light side into a concavo-convex shape.

Example 1

Figure 7:
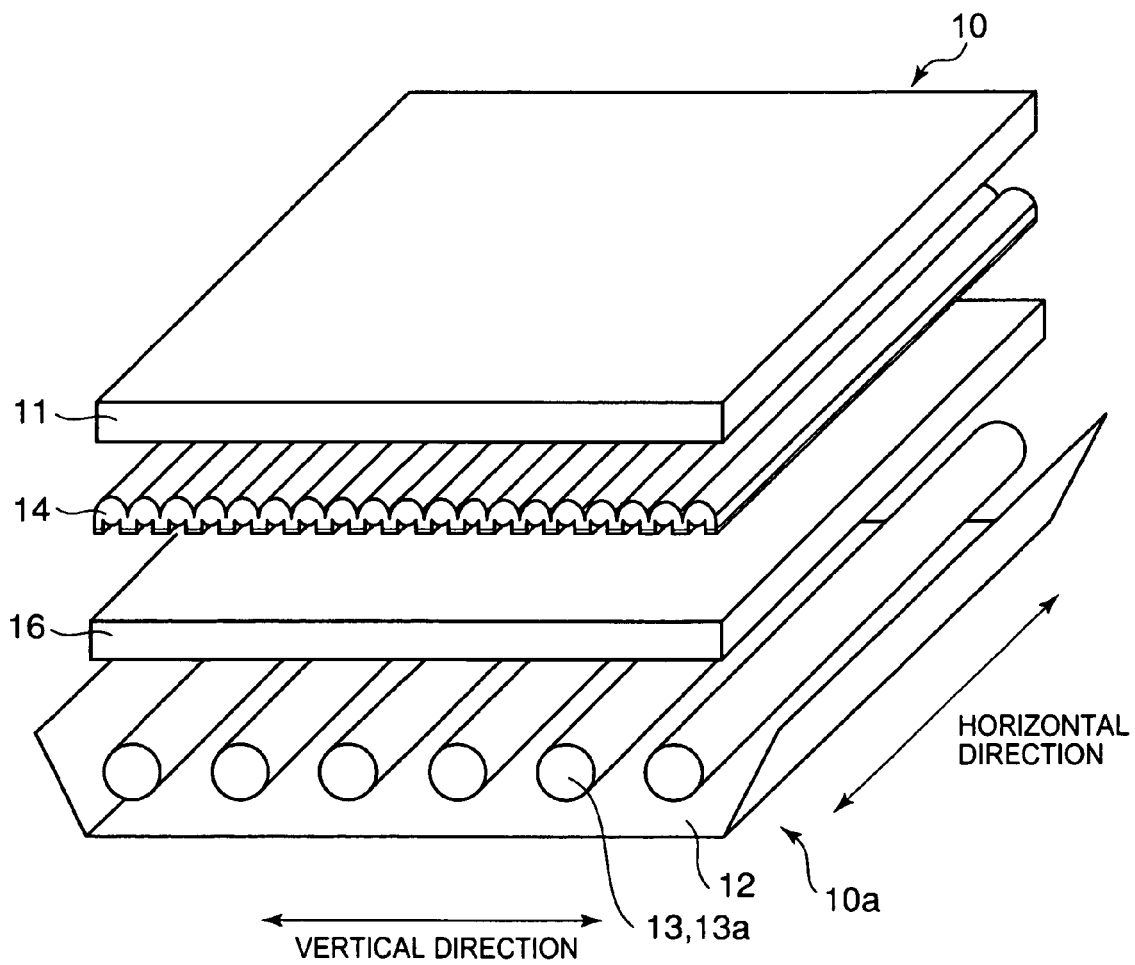
FIG. 7 is a diagram showing Example 1 of a transmission-type display device including a surface light source device according to a second embodiment of the present invention.

FIG. 7 is a diagram showing Example 1 of a transmission-type display device including a surface light source device according to a second embodiment of the present invention.

It is noted that the drawings described below, including FIG. 7, respectively show typical expressions, and hence emphasize, appropriately, sizes and/or shapes of respective portions in order to facilitate understanding.

A transmission-type display device 10 according to this embodiment comprises an LCD (Liquid Crystal Display) panel 11, a reflecting plate 12, emission tubes 13, a light controlling sheet 14, and an opal plate 16, wherein image information to be formed on the LCD panel 11 is displayed by illumination provided from the back side. A surface light source device 10a adapted to illuminate the LCD 11 panel from the back side is composed of the reflecting plate 12, emission tubes 13, light controlling sheet 14 and opal plate 16.

The LCD panel 11 is formed of a transmission-type liquid crystal display element, which has a 30-inch size and is adapted for 800×600 dot display. For the LCD panel 11, the direction along the longitudinal direction of the emission tubes 13 is regarded as the horizontal direction while the direction along which the emission tubes are arranged is regarded as the vertical direction.

The emission tubes 13 are cold-cathode tubes of a linear light source type for forming a light source 13a as a back light. In this embodiment, six emission tubes 13 are arranged in parallel at an approximately 75 mm equal interval. On the back side of the emission tubes 13, a reflecting plate 12 is provided.

The reflecting plate 12 is provided over the whole surface (back side) of the emission tubes 13 opposite to the light controlling sheet 14, and is adapted to reflect illuminating light traveling toward the back face side, by diffuse reflection, and direct it toward the light controlling sheet 14 (in the outgoing direction), thus approximating the illuminance of the incident light to a uniformed state.

The opal plate 16 is a diffusion plate having a non-directional light diffusing property, and is disposed on the light source side of the light controlling sheet 14.

Figure 8:
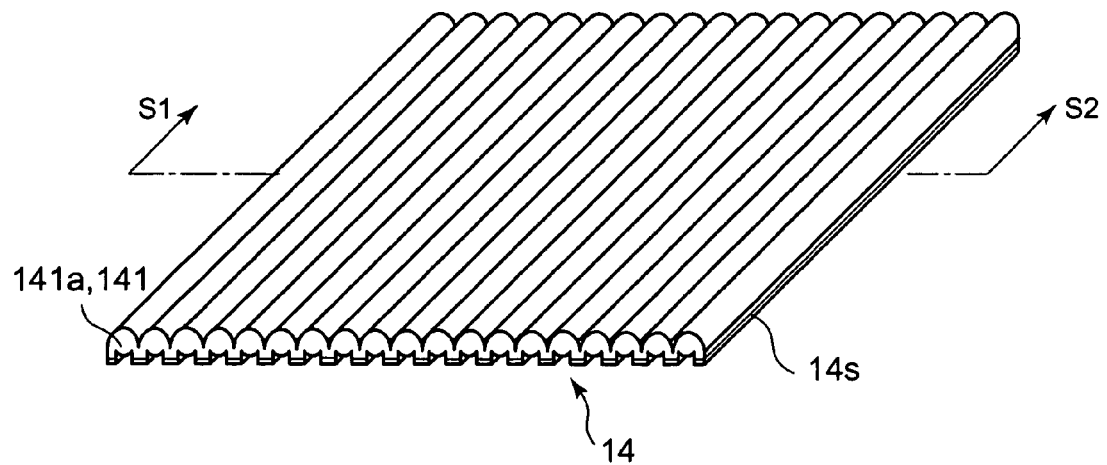
FIG. 8 is a perspective view showing a light controlling sheet.

FIG. 8 is a perspective view showing the light controlling sheet 14.

The light controlling sheet 14 has a sheet surface 14S, which is a lens sheet adapted to reduce and uniformalize uneven brightness of light emitted from the emission tubes 13 so as to condense the outgoing light into a desired range of the outgoing angle. The light controlling sheet 14 is provided on the outgoing light side, and comprises an outgoing light side lens portion 141a including multiple unit lenses 141 adapted to condense and radiate light, and transparent portions 143 and reflecting portions 144 both provided on the incident light side. Each unit lens 141 has a shape constituting a part of continuous elliptical cylinders. In the surface on the outgoing light side of the light controlling sheet 14, the unit lenses 141 are arranged in parallel with one another in large numbers. The direction along which the unit lenses 141 are arranged is coincident with the direction along which the emission tubes 13 are arranged (see FIG. 7).

The light controlling sheet 14 of this example is integrally molded by extrusion molding, using a clear PMMA resin (Polymethyl Methacrylate: acryl resin) having a refractive index of 1.49.

In this way, the shaping on both sides at the same time utilizing the extrusion method for molding the light controlling sheet 14 can enhance the productivity. Since both the incident light side and outgoing light side of the light controlling sheet 14 are formed with the same material, the water absorption and/or coefficient of linear expansion becomes equal. Thus, even under changes of temperature and humidity, both the incident light side and outgoing light side will exhibit the same behavior. Therefore, there will be no occurrence of conspicuous deformation or warp only on one side, thereby enhancing resistance to changes of environment.

It should be noted that the light controlling sheet 14 is not limited to the PMMA resin, and other thermoplastic resins having proper optical transparency may be optionally selected and used. Alternatively, the light controlling sheet 14 may be produced by a method called ultraviolet-ray molding, which employs an ultraviolet-ray curable resin.

Figure 9:
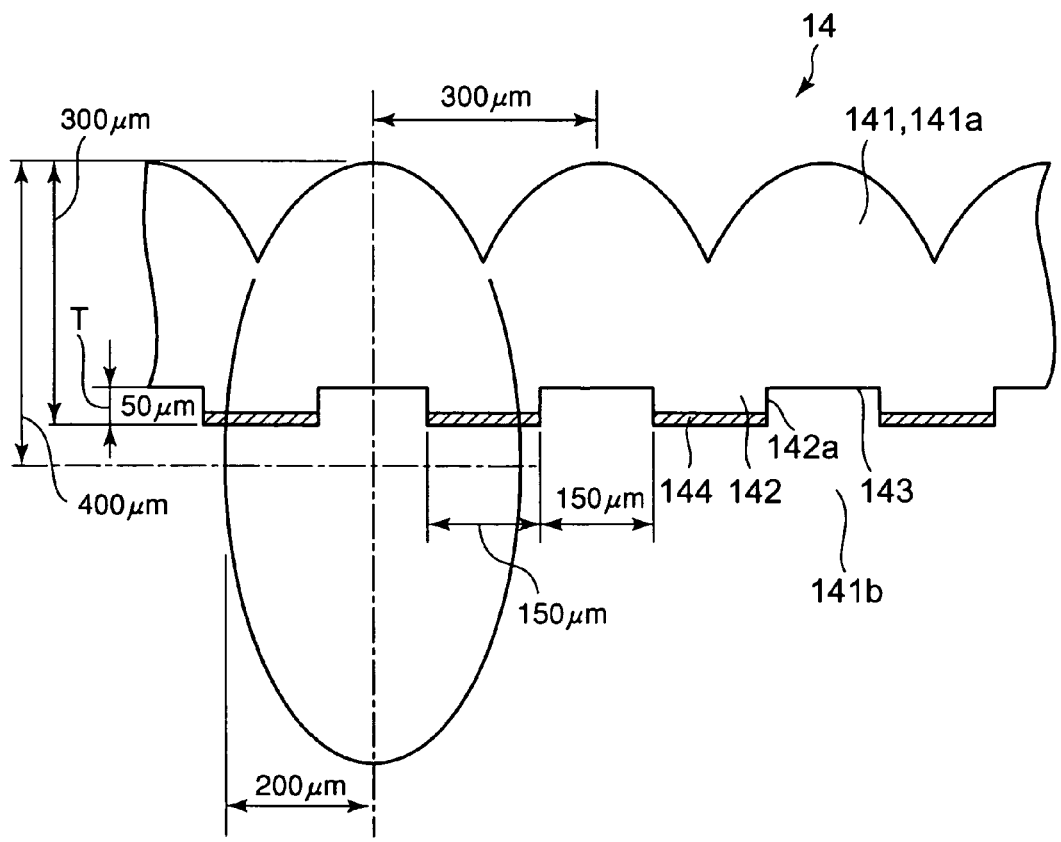
FIG. 9 is a cross section of the light controlling sheet, taken along line S1-S2 shown by arrows in FIG. 2.

FIG. 9 is a cross section of the light controlling sheet 14 taken along line S1-S2 designated by arrows in FIG. 8. In FIG. 9, the upper side depicts the outgoing light side.

As shown in the cross section of FIG. 9, each unit lens 141 is formed of a part of elliptical cylinder shape which has a semi-major axis of 400 μm and a semi-minor axis of 200 μm, and arranged with a pitch of 300 μm, with the major axis being orthogonal to the sheet surface of the light controlling sheet 14.

On the incident light side of the light controlling sheet 14, concavo-convex portions 141b are formed, comprising multiple convex portions 142 and concave portions 143 each interposed between each adjacent pair of the convex portions 142. On each of the convex portions 142, a reflecting portion 144 is provided, while each concave portion 143 constitutes a transparent portion adapted to transmit light.

Each concave portion 143 is arranged with a width of 150 µm at a position such that the center of the concave portion 143 is aligned with an apex of a unit lens when viewed from the normal line direction to the sheet surface 14S.

Each convex portion 142 is provided such that a projecting amount, measured at a portion interposed between each adjacent pair of concave portions 143, from an apex of each concave portion 143 becomes 50 µm, and its width is 150 µm.

The thickness of the light controlling sheet 14 is 350 µm.

When assuming that the projecting amount measured at each convex portion 142 from an apex of each concave portion 143 is T, the range of T is preferably 5 µm≦T≦60 µm. The lower limit of the projecting amount T is determined from a limit value which enables printing without requiring any special masking on the premise that reflecting layers 144 described below are formed by printing. The upper limit of the projecting amount T is determined to be within a range that can control the amount of illuminating light, which comes in one side face 142a of each convex portion 142 and then comes out at a relatively large outgoing angle as it has traveled, to be acceptable (see light D in FIG. 10).

Figure 12:
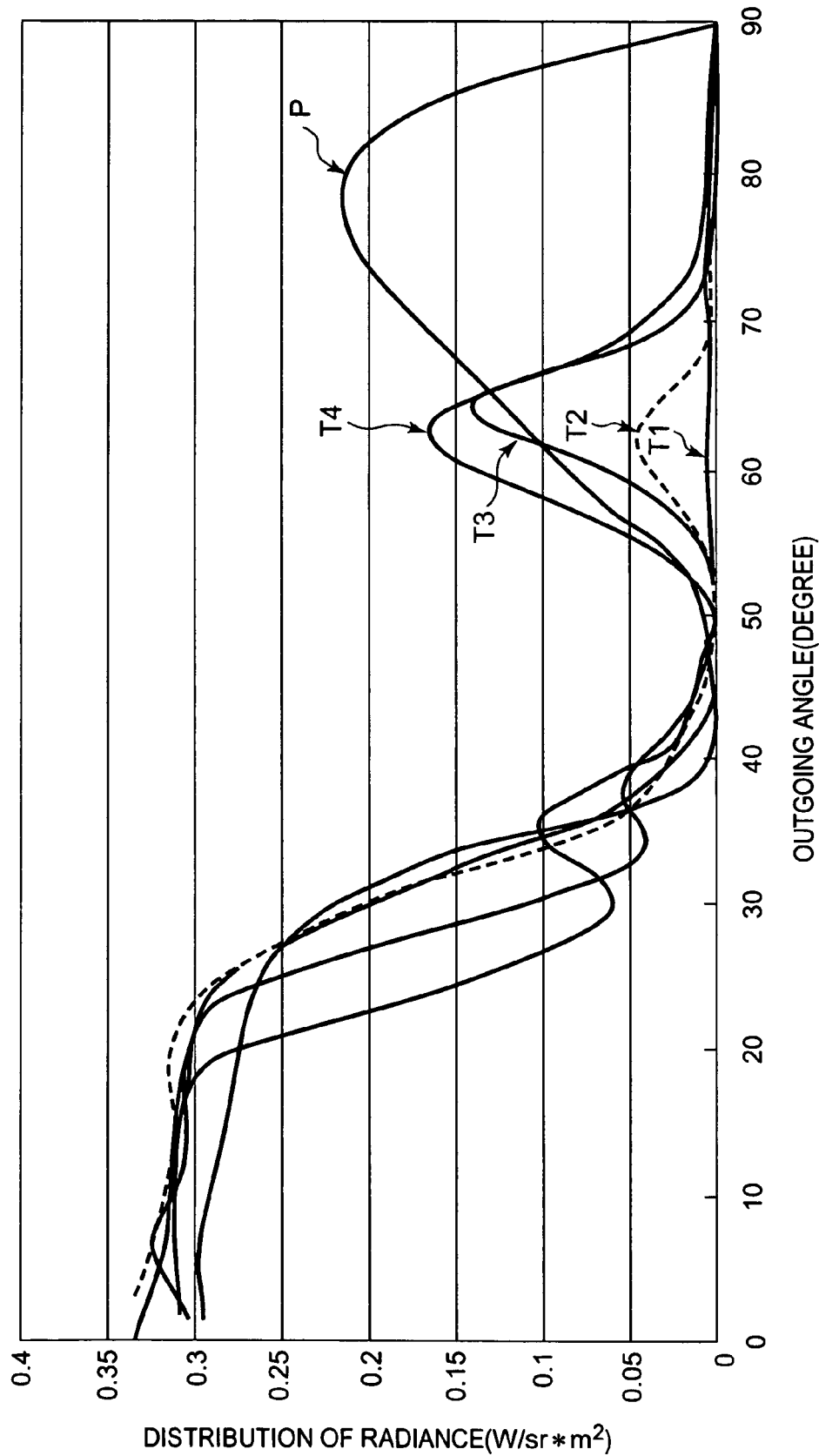
FIG. 12 is a graph showing distribution of radiance relative to the outgoing angle for each projecting amount T of a convex portion from a concave portion.

FIG. 12 is a graph showing distribution of radiance relative to the outgoing angle for each projecting amount T of a convex portion 142 from a concave portion 143. In FIG. 12, curve T1 designates a case where the projecting amount of each convex portion 142 is 5 µm, curve T2 designates a case of the projecting amount of 30 µm, curve T3 designates a case of 60 µm, and curve T4 designates a case of 90 µm. Curve P designates a case in which the sheet is formed by arranging rectangular prisms each having an isosceles-triangular cross section in large numbers, as a comparative example.

For the curve T1 to T3, the radiance within a range of smaller outgoing angles is higher than the comparative example, while rising of radiance within a range of larger outgoing angles (unnecessary range) is lower than the comparative example, thus providing ideal distribution. It is noted that, in each case of light controlling sheets 14 employed to measure these curves T1 to T3, the reflective layers 144 can be formed with ease.

Contrary, in the case of light controlling sheet 14 employed to measure the curve T4, although the reflecting layer 144 can be performed with ease, the rising of radiance within a range of larger outgoing angles (unnecessary range) is as high as the comparative example.

Consequently, the projecting amount T of the convex portions 142 is preferably in the range of 5 µm≦T≦60 µm.

Each reflecting portion 144 is formed on the incident-light-side surface of each convex portion 142 and serves as a diffusion reflecting surface for reflecting illuminating light by diffusion reflection. The reflecting portions 144 of this embodiment are formed by printing white color ink containing titanium oxide as a pigment on the incident-light-side surfaces of the convex portions 142. When using the white color ink, light which is not reflected will be transmitted by diffusion, thus the utilization efficiency of light can be enhanced. However, for the reflecting portions 144, if employing reflecting surfaces formed from aluminum or silver rather than using the diffusion reflecting surface formed with white color ink or the like, some amount of light will be absorbed, thus degrading the utilization efficiency of light. Also, if employing such metals, blackening or deterioration of reflectance may occur due to oxidization, thus an overcoat or the like must be required to prevent such phenomena, leading to increase of the production cost. Accordingly, it is preferred that the reflecting portions 144 are composed of diffusion reflecting surfaces formed with white color ink or the like.

Figure 10:
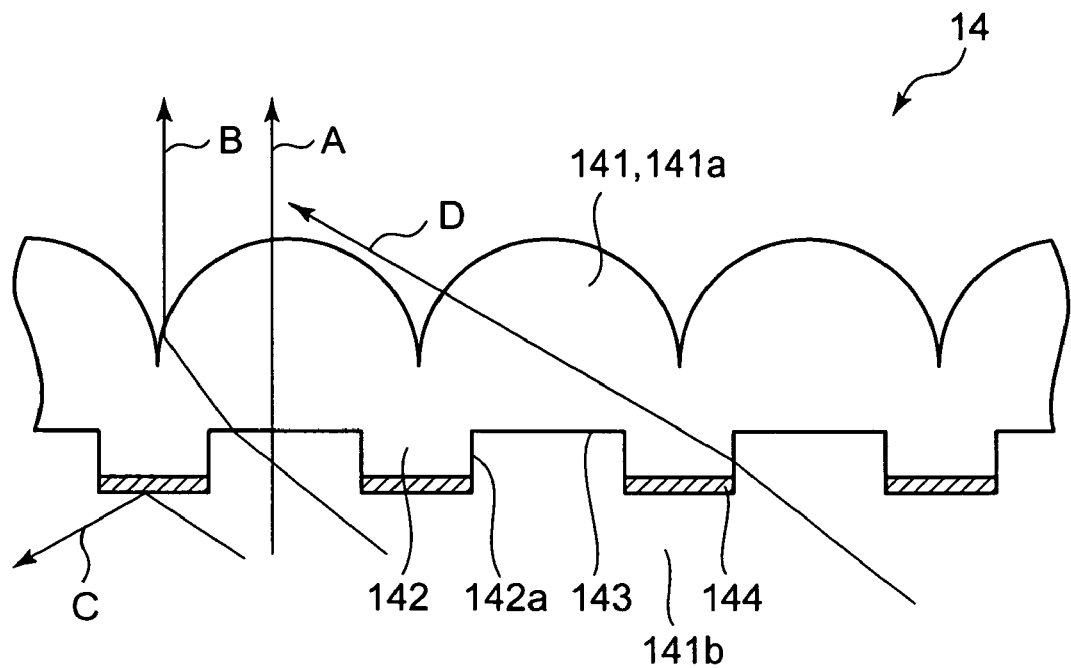
FIG. 10 is a diagram illustrating ways of travel of light which comes in the light controlling sheet.

FIG. 10 is a diagram illustrating ways of travel of light which comes in the light controlling sheet 14.

As illustrated by using light A and light B, light which comes in the concave portions 143 will come out at a smaller outgoing angle (in a direction nearer to the direction of the normal line relative to the sheet surface).

Meanwhile, as is shown by light C, light which reaches a surface facing the incident light side of a convex portion 142 is reflected by the reflecting layer 144 and returned to the light source side for reutilization.

As illustrated by light D, light which comes in a side face 142a of a convex portion 142 will come out in a direction of an unnecessarily large outgoing angle. As described above, however, restriction of the projecting amount T of the convex portions 142 can reduce such outgoing light to an unquestionable level.

According to this embodiment, since the unit lenses 141 are arranged on the outgoing light side while the reflecting portions 144 adapted to perform diffuse reflection are provided on the incident light side, illuminating light can be condensed into a desired area with high efficiency without generating Newton rings even though being superimposed on the opal plate 16. In addition, since the light controlling sheet 14 is integrally molded using the same material, and the surface areas of the sheet 14 both on the incident light side and on the outgoing light side are substantially the same, excellent resistance to changes of environment can be realized. Furthermore, since the light controlling sheet 14 is integrally molded by extrusion molding and the reflecting portions 144 are formed on the convex portions 142 by printing, enhanced productivity can be provided.

Example 2

Figure 11:
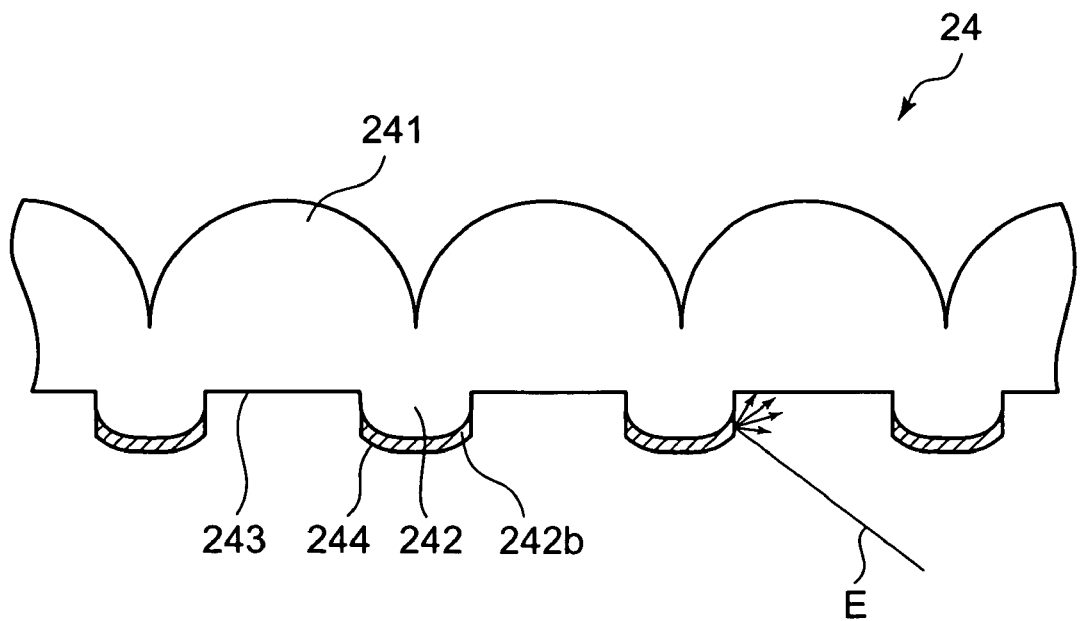
FIG. 11 is a diagram showing Example 2 of a transmission-type display device including a surface light source device according to a second embodiment of the present invention.

FIG. 11 is a diagram showing Example 2 of a transmission-type display device including a surface light source device according to the second embodiment of the present invention.

A light controlling sheet 24 of this Example 2 includes convex portions 242 formed by modifying the convex portions 142 of the light controlling sheet 14 in the Example 1. Accordingly, like parts performing the same functions as those in the Example 1 described above are designated by like reference numerals, and repetitive explanations will be omitted appropriately.

Each convex portion 242 has a gently curved face 242b formed by rounding each ridgeline portion around the boundary between each convex portion 142 and each concave portion 143 in the Example 1. A reflective layer 244 is also formed on each curved face 242b. By providing such curved faces 242b, a portion corresponding to each side face 142a of the convex portion 142 in the Example 1 can be substantially eliminated. Since the reflecting layer 244 adapted to reflect light by diffusion reflection is formed on each curved face 242b, and it has a rounded outline, light coming in along a route as shown by light E will not travel as the light D in FIG. 10 does, but is reflected with diffusion by the reflecting layer 244, thus a part of the reflected light can be reutilized. Accordingly, light coming out at an unnecessary large outgoing angle can be further reduced.

In this embodiment, since the curved faces 242b are provided, and the reflecting layers 244 are further provided thereon, both the condensing ratio and the utilization efficiency of light can be further enhanced.

(Variations)

Without being limited to the examples described above, various variations and modifications are possible to be made, and they are also within equivalent of the present invention.

(1) In each example, while an example of the surface light source device in which linear light sources are arranged in parallel has been illustrated and described, the example is not limited to this aspect, but may be a surface light source device employing point light sources.

(2) In each example, while an example of the controlling sheet wherein one sort of unit lenses are arranged on the outgoing light side has been described, the example is not limited to this aspect. For instance, many kinds of unit lenses may be arranged in combination on the outgoing light side.

(3) In each example, while an example in which a single light controlling sheet is arranged such that light can be controlled in the vertical direction has been described. The example is not limited to this aspect. For instance, another light controlling sheet which is similar to the light controlling sheet for controlling light in the vertical direction may be further provided so as to control light also in the horizontal or left to right direction.

(4) In each example, when deformation of the light controlling sheet due to effect of the water absorbing property or heat transferring ability is problematic, and in the case where the surface area on the incident light side is designated as Si and the surface area on the outgoing light side is So, it is preferred that the relationship of $0.8 < Si/So < 1.2$ can be satisfied. Satisfying the above relationship can translate into the fact that the surface area on the incident light side and that on the outgoing light side to be subjected to effect of the moisture absorbing property or thermal conductivity are substantially the same. Accordingly, even though there are some changes in temperature and/or humidity, the incident light side and the outgoing light side will experience substantially the same effect, and hence there will be no occurrence of marked deformation or warp only on one side, thereby enhancing resistance to changes of environment.

According to the present invention, the following effects can be obtained.

(1) Since an apex of each unit lens and a central portion of each corresponding concave portion are arranged at positions such that they are aligned with each other when viewed along the normal line direction relative to the sheet surface, and a reflecting layer is formed on each convex portion, illuminating light can be condensed efficiently into a desired area without generating Newton rings, as well as, the productivity can be significantly enhanced.

(2) Due to diffusion reflection of light by the reflecting layers, the utilization efficiency of light can be enhanced, as well as, the need of providing any additional element, such as an overcoat can be eliminated, thus improving the productivity.

(3) Since the projecting amount of each convex portion from each concave portion is within the range of from 5 μm to 60 μm, the formation of the reflecting layers by printing can be facilitated while reducing an amount of light coming out along unnecessary directions.

(4) Since the unit lenses, convex portions and concave portions are integrally molded, thus enhancing the productivity, and also improving the resistance to changes of environment.

(5) When assuming that the surface area on the incident light side is Si, and the surface area on the outgoing light side is So, the relationship of $0.8 < Si/So < 1.2$ can be satisfied. Thus, the resistance to changes of environment can be improved.

(6) Since each convex portion has a gently curved face formed by rounding each ridgeline portion around the boundary between each convex portion and each concave portion, and a reflecting layer is also formed on each curved face, light coming out along unnecessary directions can be substantially eliminated.

Third Embodiment

This embodiment is made by adding features which will be described below to the first embodiment shown in FIGS. 1 through 6, and the other parts of this embodiment are substantially the same as those in the first embodiment.

Also, the area that the transparent portions on the incident light side comprise relative to the whole surface of the light controlling sheet is substantially the same as that in the first embodiment.

According to this embodiment, the principal objects to condense illuminating light into a desired area with high efficiency, enhance resistance to changes of environment and improve the productivity can be achieved by forming the shape on the incident light side into a concavo-convex shape and employing curved convex portions.

Example

FIG. 7 is a diagram showing one example of a transmission-type display device including a surface light source device according to the present invention.

It is noted that the drawings described below, including FIG. 7, respectively show typical expressions, and hence emphasize, appropriately, sizes and/or shapes of respective portions in order to facilitate understanding.

A transmission-type display device 10 according to this embodiment comprises an LCD (Liquid Crystal Display) panel 11, a reflecting plate 12, emission tubes 13, a light controlling sheet 14, and an opal plate 16, wherein image information to be formed on the LCD panel 11 is displayed by illumination provided from the back side. A surface light source device 10a adapted to illuminate the LCD panel 11 from the back side is composed of the reflecting plate 12, emission tubes 13, light controlling sheet 14 and opal plate 16.

The LCD panel 11 is formed of a transmission-type liquid crystal display element, constituting a transmission-type displaying portion which has a 30-inch size and is adapted for 800×600 dot display. For the LCD panel 11, the direction along the longitudinal direction of the emission tubes 13 is regarded as the horizontal direction while the direction along which the emission tubes are arranged is regarded as the vertical direction.

The emission tubes 13 are cold-cathode tubes of a linear light source type for forming a light source 13a as a back light. In this embodiment, six emission tubes 13 are arranged at an approximately 75 mm equal interval. On the back side of the emission tubes 13, a reflecting plate 12 is provided.

The reflecting plate 12 is provided over the whole surface (back side) of the emission tubes 13 opposite to the light controlling sheet 14, and is adapted to reflect illuminating light traveling toward the back face side, by diffuse reflection, and direct it toward the light controlling sheet 14 (in the outgoing direction), thus approximating the illuminance of the incident light to a uniformed state.

The opal plate 16 is a diffusion plate having a non-directional light diffusing property, and is disposed on the light source side of the light controlling sheet 14.

FIG. 8 is a perspective view showing the light controlling sheet 14.

The light controlling sheet 14 has a sheet surface 14S, which is a lens sheet adapted to reduce and uniformalize uneven brightness of light emitted from the emission tubes 13 so as to condense the outgoing light into a desired range of the outgoing angle. The light controlling sheet 14 is provided on the outgoing light side, and comprises a outgoing light side lens portion 141a including multiple unit lenses 141 adapted to condense and radiate light, and transparent portions 143 and reflecting portions 144 both provided on the incident light side. Each unit lens 141 has a shape constituting a part of continuous elliptical cylinders. In the surface on the outgoing light side of the light controlling sheet 14, the unit lenses 141 are arranged in parallel with one another in large numbers. The direction along which the unit lenses 141 are arranged is coincident with the direction along which the emission tubes 13 are arranged (see FIG. 7).

The light controlling sheet 14 of this example is integrally molded by extrusion molding, using a clear PMMA resin (Polymethyl Methacrylate: acryl resin) having a refractive index of 1.49.

In this way, the shaping on both sides at the same time utilizing the extrusion method for molding the light controlling sheet 14 can enhance the productivity. Since both the incident light side and outgoing light side of the light controlling sheet 14 are formed with the same material, the water absorption and/or coefficient of linear expansion becomes equal. Thus, even under changes of temperature and humidity, both the incident light side and outgoing light side will exhibit the same behavior. Therefore, there will be no occurrence of conspicuous deformation or warp only on one side, thereby enhancing resistance to changes of environment.

It should be noted that the light controlling sheet 14 is not limited to the PMMA resin, and other thermoplastic resins having proper optical transparency may be optionally selected and used. Alternatively, the light controlling sheet 14 may be produced by a method called ultraviolet-ray molding, which employs an ultraviolet-ray curable resin.

Figure 13:
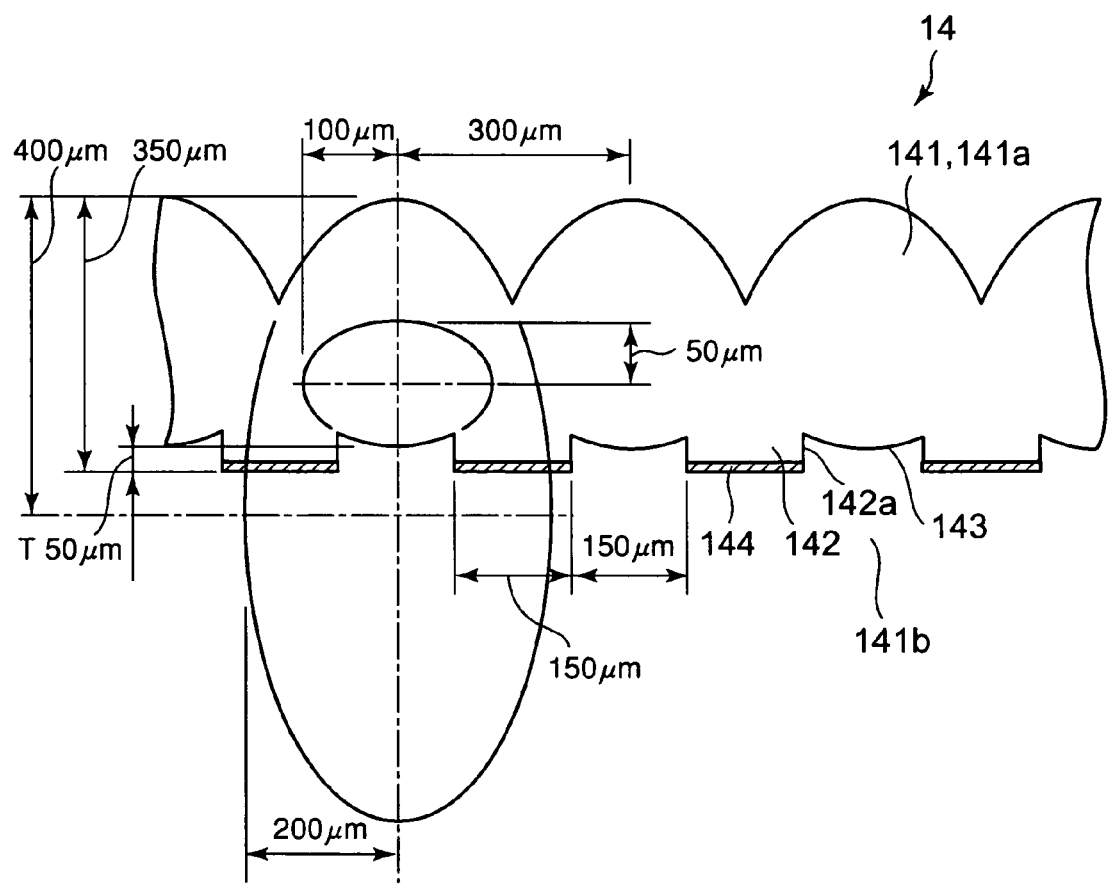
FIG. 13 is a cross section of the light controlling sheet according to a third embodiment of the present invention, taken along line S1-S2 shown by arrows in FIG. 8.

FIG. 13 is a cross section of the light controlling sheet 14 taken along line S1-S2 designated by arrows in FIG. 8. In FIG. 13, the upper side depicts the outgoing light side.

As shown in the cross section of FIG. 13, each unit lens 141 is formed of a part of elliptical cylinder shape which has a semi-major axis of 400 µm and a semi-minor axis of 200 µm, and arranged with a pitch of 300 µm, with the major axis being orthogonal to the sheet surface of the light controlling sheet 14.

On the incident light side of the light controlling sheet 14, concavo-convex portions 141b are formed, comprising multiple convex portions 142 and concave portions 143 each interposed between each adjacent pair of the convex portions 142. On each of the convex portions 142, a reflecting portion 144 is provided, while each concave portion 143 constitutes a transparent portion adapted to transmit light.

Each concave portion 143 is arranged with a width of 150 µm at a position such that the center of the concave portion 143 is aligned with an apex of a unit lens when viewed from the normal line direction to the sheet surface 14S and has a curved shape projecting toward the incident light side. The curved shape of each concave portion 143 constitutes a part of an elliptical cylinder portion having a semi-major axis of 100 µm and a semi-minor axis of 50 µm, with the major axis being parallel to the sheet surface of the light controlling sheet 14.

Each convex portion 142 is provided such that a projecting amount of the convex portion 142, measured at a portion interposed between the adjacent pair of concave portions 143, from an apex of each concave portion 143 becomes 50 µm, and its width is 150 µm.

The thickness of the light controlling sheet 14 is 350 µm.

When assuming that the projecting amount measured at each convex portion 142 from an apex of each concave portion 143 is T, the range of T is preferably 5 µm≦T≦60 µm. The lower limit of the projecting amount T is determined from a limit value which enables printing without requiring any special masking on the premise that reflecting layers 144 described below are formed by printing. The upper limit of the projecting amount T is determined to be within a range that can control the amount of illuminating light, which comes in one side face 142a of each convex portion 142 and then comes out at a large outgoing angle as it has traveled, to be acceptable.

Each reflecting portion 144 is formed on the incident-light-side surface of each convex portion 142 and serves as a diffusion reflecting surface for reflecting illuminating light by diffusion reflection. The reflecting portions 144 of this embodiment are formed by printing white color ink containing titanium oxide as a pigment on the incident-light-side surfaces of the convex portions 142. When using the white color ink, light which is not reflected will be transmitted by diffusion, thus the utilization efficiency of light can be enhanced. However, for the reflecting portions 144, if employing reflecting surfaces formed from aluminum or silver rather than using the diffusion reflecting surface formed with white color ink or the like, some amount of light will be absorbed, thus degrading the utilization efficiency of light. Also, if employing such metals, blackening or deterioration of reflectance may occur due to oxidization, thus an overcoat or the like must be required to prevent such phenomena, leading to increase of the production cost. Accordingly, it is preferred that the reflecting portions 144 are composed of diffusion reflecting surfaces formed with white color ink or the like.

Now, in order to explain the reason for providing a curved shape for each concave portion 143 projecting toward the incident light side, a comparative example including concave portions 143 each having a flat face parallel to the sheet surface rather than having a curved shape will be described.

Figure 14:
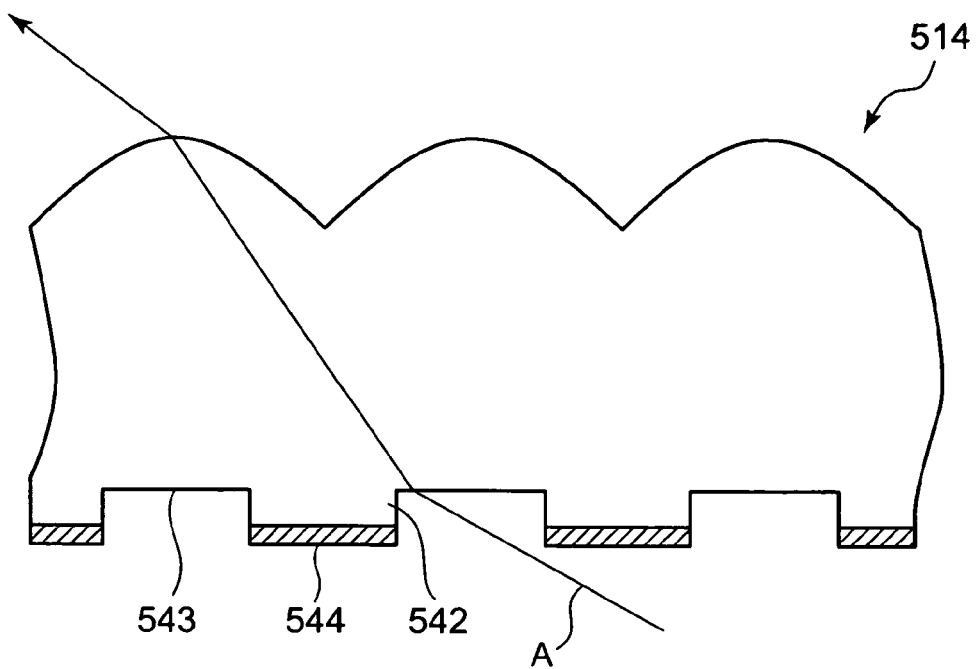
FIG. 14 is a diagram illustrating a way of travel of light which comes in a light controlling sheet of a comparative example.

FIG. 14 is a diagram illustrating a way of travel of light which comes in a light controlling sheet 514 of a comparative example.

The comparative example illustrated in FIG. 14 is different from the light controlling sheet 14 of this embodiment in that the concave portions have flat faces. The other parts, however, are the same as those in the sheet 14 of this embodiment.

In the case where each concave portion 543 is formed into a flat face, light which comes in a concave portion 543 at a point near either end (point near an adjacent convex portion) of the concave portion 543 at a large incident angle as is shown by light A will not reach a unit lens which is located at a position that the light would reach if it could travel along the normal line relative to the sheet surface from that concave portion 543, but reach an adjacent unit lens. Thus the light comes out from the unit lens at a larger outgoing angle than expected. In order to reduce the amount of light which comes out from such an adjacent unit lens as shown by light A, reduction of the sheet thickness is effective. If attempting to reduce the sheet thickness, however, the production will be significantly difficult, and also, the resistance to changes of environment will be deteriorated. Hence, in the light controlling sheet 14 of this example, in order to substantially eliminate the light traveling along such a direction as shown by light A, rather than reducing the thickness of the sheet, each concave portion 143 is formed into a curved shape projecting toward the incident light side.

Figure 15:
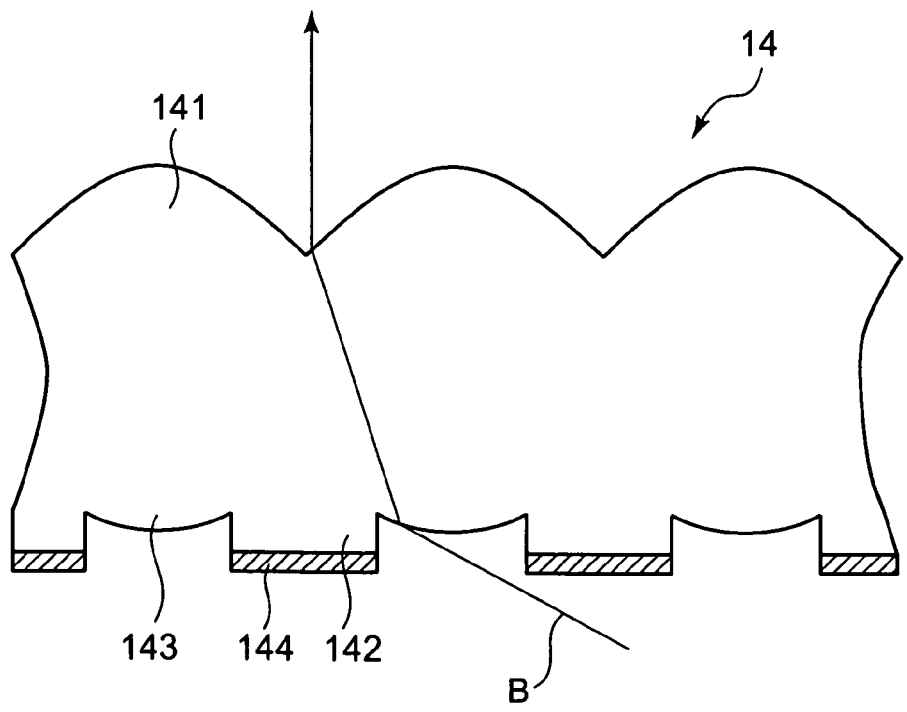
FIG. 15 is a diagram illustrating a way of travel of light which comes in the light controlling sheet of this embodiment.

FIG. 15 is a diagram illustrating a way of travel of light which comes in the light controlling sheet 14 of this example.

Light B comes in the sheet 14 at the same incident angle as that of light A shown in FIG. 14. However, since each concave portion 143 is of a curved shape projecting toward the incident light side, the direction along which the incident light travels in the light controlling sheet 14 is changed, as such the light comes out from a unit lens 141 located at a position that the light will reach if it can travel along the normal line relative to the sheet surface 14S from the concave portion 143 which it comes in. Accordingly, the outgoing angle of the light becomes smaller, thereby condensing the light with higher efficiency.

The curved shape of each concave portion 143 of the light controlling sheet 14 of this example constitutes a part of an elliptical cylinder portion, with the major axis being parallel to the sheet surface of the light controlling sheet 14. This is because it is preferable that the curved shape around a central portion of each concave portion 143 is a more flattened or parallel shape relative to the sheet surface 14S for reducing or substantially eliminating the influence on light coming in the central portion of the concave portion. In addition, it is preferred that the curvature becomes larger at a point of the concave portion 143 closer to an adjacent convex portion so as to reduce light which comes out along unnecessary directions while increasing light to be condensed along necessary directions. In other words, it is preferred that the curved shape of each concave portion 143 has a smaller angle defined between a tangent obtained around a central portion of the curve and the sheet surface 14S while having a larger angle defined between a tangent obtained at a point of the curve closer to an adjacent convex portion 142 and the sheet surface 14S. Accordingly, such a curved shape of each concave portion 143 is not limited to an elliptical cylinder, but may include a curved face which is substantially flat and parallel, relative to the sheet surface 14S, around its central portion, but projecting toward the incident light side in the vicinity of both ends.

Figure 16:
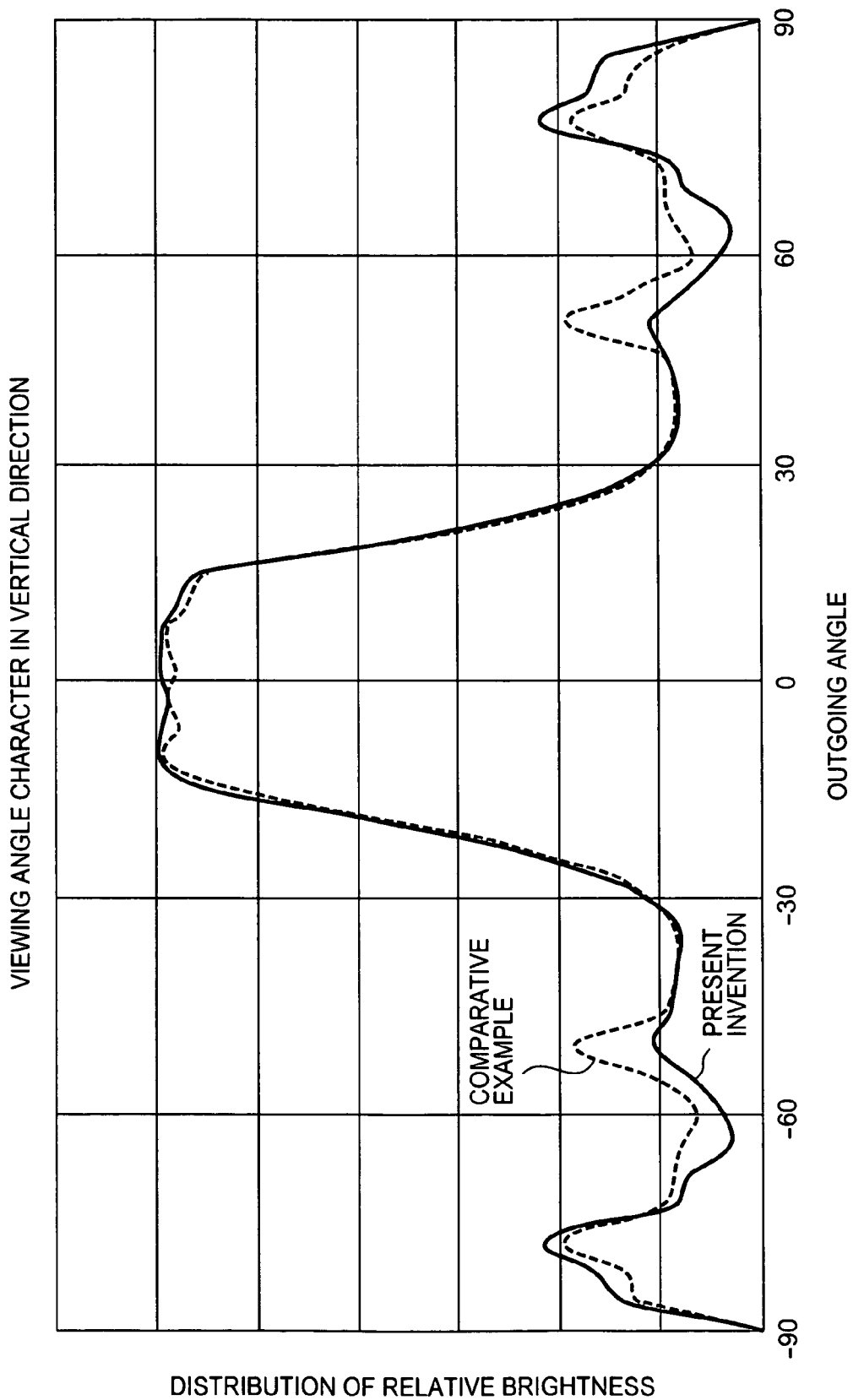
FIG. 16 is a graph showing distribution of brightness in the vertical direction of the light controlling sheet of this embodiment and a similar sheet of a comparative example.

FIG. 16 is a graph showing distribution of brightness in the vertical direction of the light controlling sheet 14 of this example and a similar sheet of a comparative example 514. The brightness shown in FIG. 16 is expressed as a ratio (relative brightness) relative to a reference value which is defined as brightness measured at an outgoing angle of 0 degree for the comparative light controlling sheet 514.

In the comparative light controlling sheet 514, there are unnecessary peaks of brightness at outgoing angles around ±50 degrees, while in the light controlling sheet 14 of this example, this problem is dissolved. In addition, due to the light controlling sheet 14, since the light coming out along such unnecessary directions (directions defining relatively large outgoing angles) tends to be condensed into directions defining relatively small outgoing angles, the brightness at outgoing angles around 0 degree can also be enhanced.

According to this example, since the unit lenses 141 are arranged on the outgoing light side, while the reflecting layers 144 adapted to effect diffusion reflection are provided on the incident light side, illuminating light can be condensed into a desired area with high efficiency without generating Newton rings even though being superimposed on the opal plate 16.

In addition, since the light controlling sheet 14 is integrally molded using the same material, and the surface areas on both the incident light side and outgoing light side are substantially the same, enhanced resistance to changes of environment can be realized. Furthermore, since the light controlling sheet 14 is integrally molded by extrusion molding and the reflecting portions 144 are formed on the convex portions 142, the productivity can be improved.

Since the shape of each concave portion 143 includes a curved face projecting toward the incident light side, unnatural brightness peaks occurring due to light coming out at relatively large outgoing angles can be reduced, while light coming out into a desired area can be increased.

(Variations)

Without being limited to the examples described above, various variations and modifications are possible to be made, and they are also within equivalent of the present invention.

(1) In this example, while an example of the surface light source device in which linear light sources are arranged in parallel has been illustrated and described, the example is not limited to this aspect, but may be a surface light source device employing point light sources.

(2) In this example, while an example of the controlling sheet wherein one sort of unit lenses are arranged on the outgoing light side has been described, the example is not limited to this aspect. For instance, many kinds of unit lenses may be arranged in combination on the outgoing light side.

(3) In this example, while an example in which a single light controlling sheet is arranged such that light can be controlled in the vertical direction has been described. The example is not limited to this aspect. For instance, another light controlling sheet which is similar to the light controlling sheet for controlling light in the vertical direction may be further provided so as to control light also in the horizontal or left to right direction.

Figure 23:
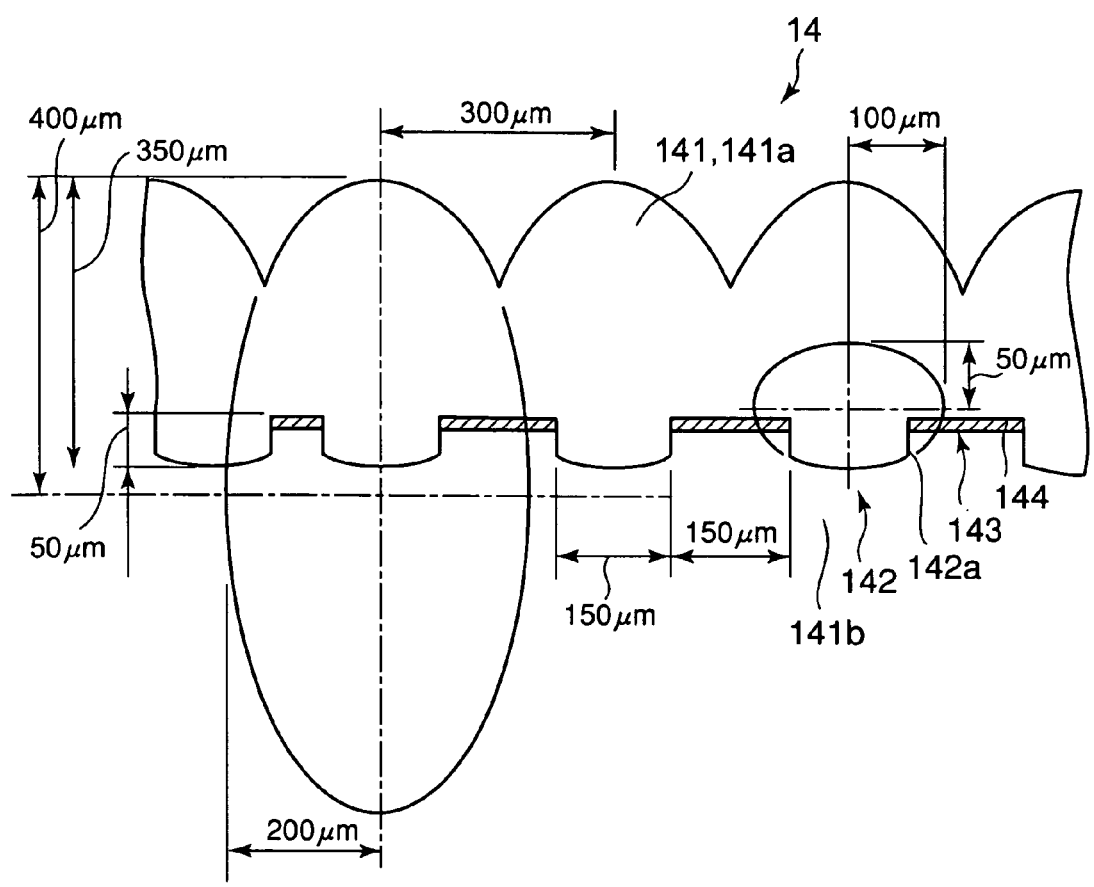
FIG. 23 is a cross section of the light controlling sheet according to a fifth embodiment of the present invention, taken along line S1-S2 shown by arrows in FIG. 18.

(4) In this example, when deformation of the light controlling sheet due to effect of the water absorbing property or heat transferring ability is problematic, and in the case where the surface area on the incident light side is designated as Si and the surface area on the outgoing light side is So, it is preferred that the relationship of $0.8 < Si/So < 1.2$ can be satisfied. Satisfying the above relationship can translate into the fact that the surface area on the incident light side and that on the outgoing light side to be subjected to effect of the moisture absorbing property or thermal conductivity are substantially the same. Accordingly, even though there are some changes in temperature and/or humidity, the incident light side and the outgoing light side will experience substantially the same effect, and hence there will be no occurrence of conspicuous deformation or warp only on one side, thereby enhancing resistance to changes of environment. The assessment of the surface area can be performed by using a shape expressed by the cross section as shown in FIG. 23 for example.

According to the present invention, the following effects can be obtained.

(1) Since an apex of each unit lens and a central portion of each corresponding concave portion are arranged at positions such that they are aligned with each other when viewed along the normal line direction relative to the sheet surface, and a reflecting layer is formed on each convex portion and each concave portion includes a curved face projecting toward the incident light side, illuminating light can be condensed efficiently into a desired area without generating Newton rings, as well as, the productivity can be significantly enhanced. In addition, light which comes out along unnecessary directions can be reduced, while light coming out along desired directions can be condensed in a greater amount.

(2) Since the curved shape of each concave portion has a smaller angle defined between a tangent obtained around a central portion of the curve and the sheet surface while having a larger angle defined between a tangent obtained at a point of the curve closer to an adjacent convex portion and the sheet surface, light coming out along unnecessary directions can be reduced without affecting light coming in a portion in the vicinity of the central portion of the concave portion, thereby condensing light along desired directions in a greater amount.

(3) Since the curved shape of each concave portion is a part of an elliptical cylinder, light coming out along unnecessary directions can be reduced without affecting light coming in a portion in the vicinity of the central portion of the concave portion, thereby condensing light along desired directions in a greater amount.

(4) Due to diffusion reflection of light by the reflecting layers, the utilization ratio of light can be enhanced, as well as, the need of providing any additional element, such as an overcoat can be eliminated, thus improving the productivity.

(5) Since the projecting amount of each convex portion from an apex of each concave portion is within the range of from 5 μm to 60 μm, the formation of the reflecting layers by printing can be facilitated while reducing an amount of light coming out along unnecessary directions.

(6) Since the unit lenses, convex portions and concave portions are integrally molded, the productivity can be enhanced, as well as, the resistance to changes of environment can be improved.

(7) When assuming that the surface area on the incident light side is Si, and the surface area on the outgoing light side is So, the relationship of 0.8<Si/So<1.2 can be satisfied. Thus, the resistance to changes of environment can be improved.

Fourth Embodiment

This embodiment is made by adding features which will be described below to the first embodiment shown in FIGS. 1 through 6, and the other parts of this embodiment are substantially the same as those in the first embodiment.

Also, the area that the transparent portions on the incident light side comprise relative to the whole surface of the light controlling sheet is substantially the same as that in the first embodiment.

According to this embodiment, the principal objects to provide a light controlling sheet and a surface light source device which can condense illuminating light into a desired area with high efficiency and facilitate the production can be achieved by forming their shape on the incident light side into a concavo-convex shape and providing reflecting layers on their concave portions.

Example

Figure 17:
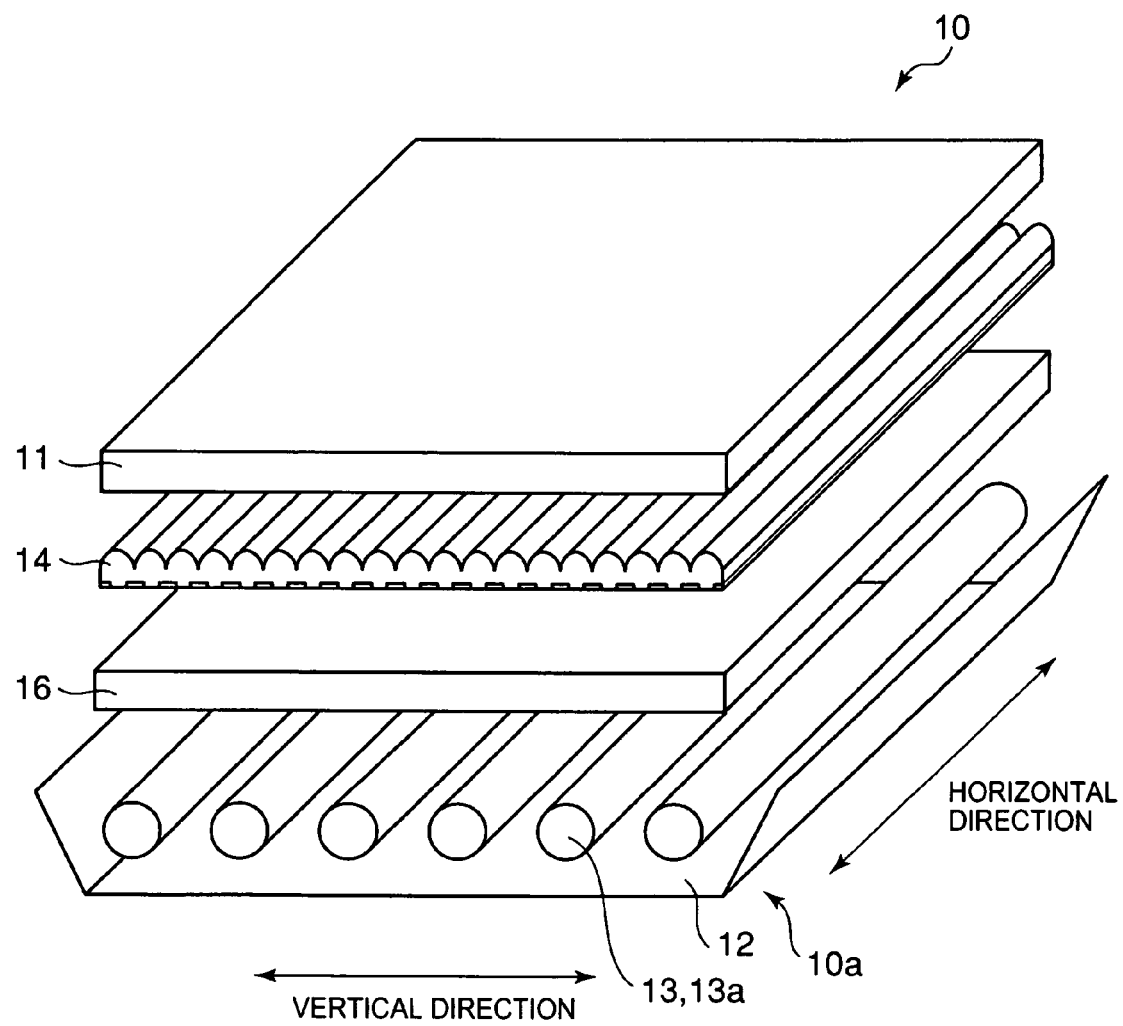
FIG. 17 is a diagram showing Example 1 of a transmission-type display device including a surface light source device according to a fourth embodiment of the present invention.

FIG. 17 is a diagram showing Example 1 of a transmission-type display device including a surface light source device according to the present invention.

It is noted that the drawings described below, including FIG. 17, respectively show typical expressions, and hence emphasize, appropriately, sizes and/or shapes of respective portions in order to facilitate understanding.

A transmission-type display device 10 according to this example comprises an LCD (Liquid Crystal Display) panel 11, a reflecting plate 12, emission tubes 13, a light controlling sheet 14, and an opal plate 16, wherein image information to be formed on the LCD panel 11 is displayed by illumination provided from the back side. A surface light source device 10a adapted to illuminate the LCD panel 11 from the back side is composed of the reflecting plate 12, emission tubes 13, light controlling sheet 14 and opal plate 16.

The LCD panel 11 is formed of a transmission-type liquid crystal display element, which has a 30-inch size and is adapted for 800×600 dot display. For the LCD panel 11, the direction along the longitudinal direction of the emission tubes 13 is regarded as the horizontal direction while the direction along which the emission tubes are arranged is regarded as the vertical direction.

The emission tubes 13 are cold-cathode tubes of a linear light source type for forming a light source 13a of the surface light source device 10a. In this example, six emission tubes 13 are arranged at an approximately 75 mm equal interval. On the back side of the emission tubes 13, a reflecting plate 12 is provided.

The reflecting plate 12 is provided over the whole surface (back side) of the emission tubes 13 opposite to the light controlling sheet 14, and is adapted to reflect illuminating light traveling toward the back face side, by diffuse reflection, and direct it toward the light controlling sheet 14 (in the outgoing direction), thus approximating the illuminance of the incident light to a uniformed state.

The opal plate 16 is a diffusion plate having a non-directional light diffusing property, and is disposed on the light source side of the light controlling sheet 14.

Figure 18:
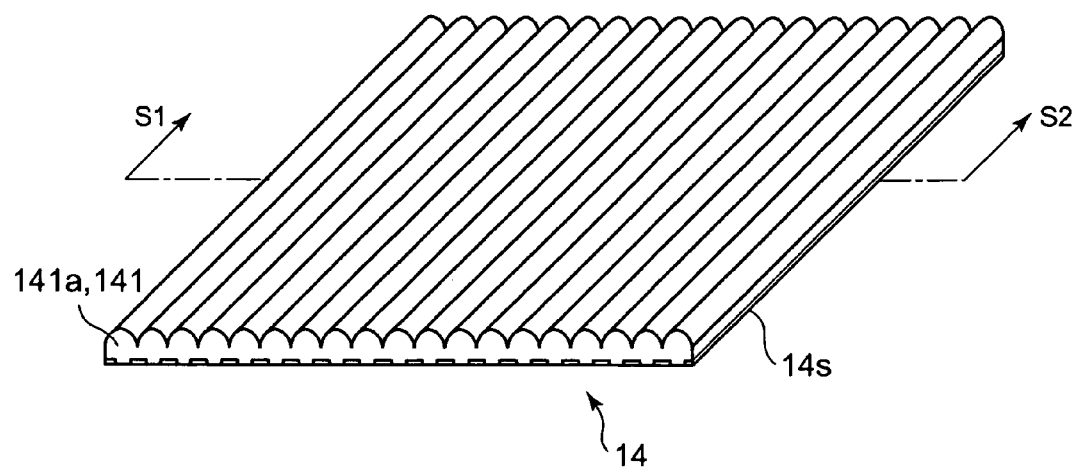
FIG. 18 is a perspective view showing a light controlling sheet.

FIG. 18 is a perspective view showing the light controlling sheet 14.

The light controlling sheet 14 has a sheet surface 14S, which is a lens sheet adapted to reduce and uniformalize uneven brightness of light emitted from the emission tubes 13 so as to condense the outgoing light into a desired range of the outgoing angle. The light controlling sheet 14 is provided on the outgoing light side, and comprises an outgoing light side lens portion 141a including multiple unit lenses 141 adapted to condense and radiate light, and transparent portions 142 and reflecting portions 144 both provided on the incident light side. Each unit lens 141 has a shape constituting a part of continuous elliptical cylinders. In the surface on the outgoing light side of the light controlling sheet 14, the unit lenses 141 are arranged in parallel with one another in large numbers. The direction along which the unit lenses 141 are arranged is coincident with the direction along which the emission tubes 13 are arranged (see FIG. 17).

The light controlling sheet 14 of this example is integrally molded by extrusion molding, using a clear PMMA resin (Polymethyl Methacrylate: acryl resin) having a refractive index of 1.49.

In this way, the shaping on both sides at the same time utilizing the extrusion method for molding the light controlling sheet 14 can enhance the productivity. Since both the incident light side and outgoing light side of the light controlling sheet 14 are formed with the same material, the moisture absorption and/or coefficient of linear expansion becomes equal. Thus, even under changes of temperature and humidity, both the incident light side and outgoing light side will exhibit the same behavior. Therefore, there will be no occurrence of conspicuous deformation or warp only on one side, thereby enhancing resistance to changes of environment.

It should be noted that the light controlling sheet 14 is not limited to the PMMA resin, and other thermoplastic resins having proper optical transparency may be optionally selected and used. Alternatively, the light controlling sheet 14 may be produced by a method called ultraviolet-ray molding, which employs an ultraviolet-ray curable resin.

Figure 19:
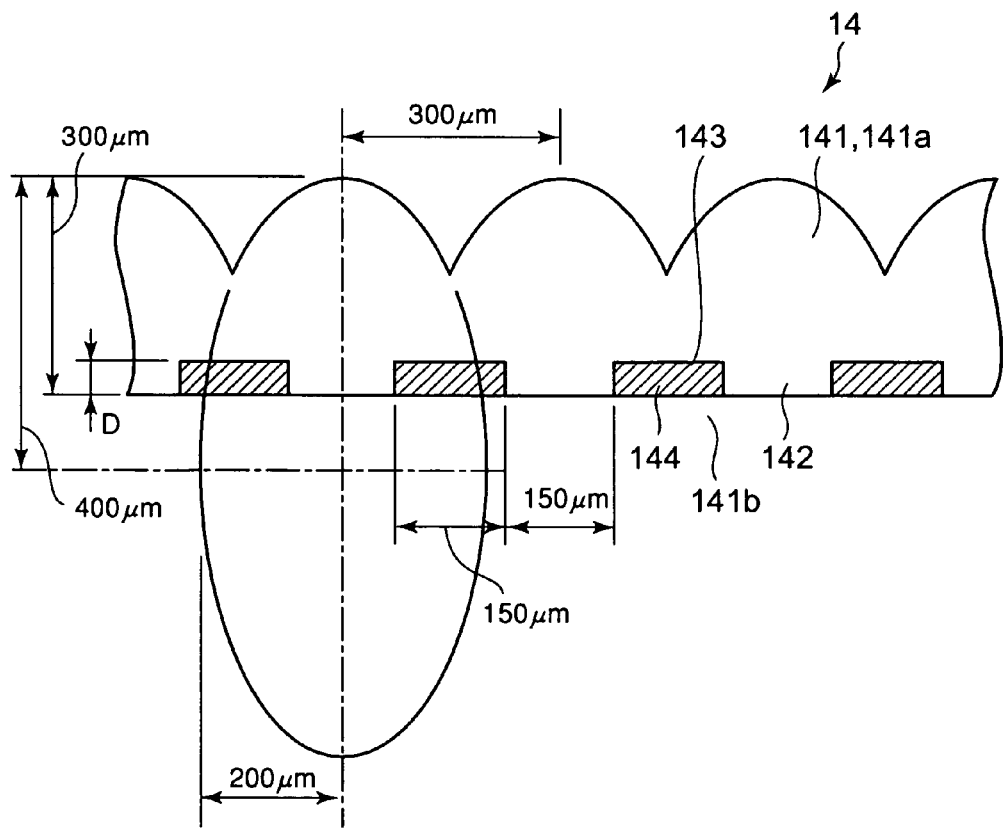
FIG. 19 is a cross section of the light controlling sheet, taken along line S1-S2 shown by arrows in FIG. 18.

FIG. 19 is a cross section of the light controlling sheet 14 taken along line S1-S2 designated by arrows in FIG. 18. In FIG. 19, the upper side depicts the outgoing light side.

As shown in the cross section of FIG. 19, each unit lens 141 is formed of a part of elliptical cylinder shape which has a semi-major axis of 400 μm and a semi-minor axis of 200 μm, and arranged with a pitch of 300 μm, with the major axis being orthogonal to the sheet surface of the light controlling sheet 14.

On the incident light side of the light controlling sheet 14, concavo-convex portions 141b are formed, comprising multiple convex portions 142 and concave portions 143 each interposed between each adjacent pair of the convex portions 142. A reflecting portion 144 is provided in each concave portion 143, while each convex portion 142 constitutes a transparent portion adapted to transmit light.

Each convex portion 142 is arranged with a width of 150 μm at a position such that the center of the convex portion is aligned with an apex of a corresponding unit lens when viewed from the normal line direction relative to the sheet surface 14S.

Each concave portion 143 is provided at a portion interposed between the adjacent pair of convex portions 142 so as to have a depth D of 50 μm as measured from the convex portions 142 and a width of 150 μm.

The thickness of the light controlling sheet 14 is 300 μm.

It is preferred that the depth of the concave portions 143 as measured from the convex portions 142 is in the range of $5 \mu m \leq D \leq 60 \mu m$. The lower limit of the depth D (5 μm) is determined from a limit value which enables the formation of reflecting layers 144 described below. The upper limit of the depth D (60 μm) is determined to avoid blocking necessary light coming in and traveling from an incident light face of each convex portion 142, making the viewing angle narrower, and causing poor ink drying ability and degradation of the productivity.

The reflecting layers 144 are formed in the concave portions 143, respectively, so as to form diffusion reflecting surfaces for reflecting illuminating light by diffusion reflection. Each reflecting layer 144 of this example is formed by leaving white color ink containing titanium oxide as a pigment only in the respective concave portions 143 but not leaving it on the convex portions 142. When using the white color ink, light which is not reflected will be transmitted by diffusion, thus the utilization efficiency of light can be enhanced.

However, for the reflecting portions 144, if employing reflecting surfaces formed from aluminum or silver rather than using the diffusion reflecting surface formed with white color ink or the like, some amount of light will be absorbed, thus degrading the utilization efficiency of light. Also, if employing such metals, blackening or deterioration of reflectance may occur due to oxidization, thus an overcoat or the like must be required to prevent such phenomena, leading to increase of the production cost. Accordingly, it is preferred that the reflecting portions 144 are composed of diffusion reflecting surfaces formed with white color ink or the like.

In order to leave the white color ink only in the concave portions 143 without leaving it on the surfaces of the convex portions 142 upon forming the reflecting layers 144, squeezing (wiping) may be used after coating the white color ink on the whole surface on the incident light side of the light controlling sheet 14.

Figure 20:
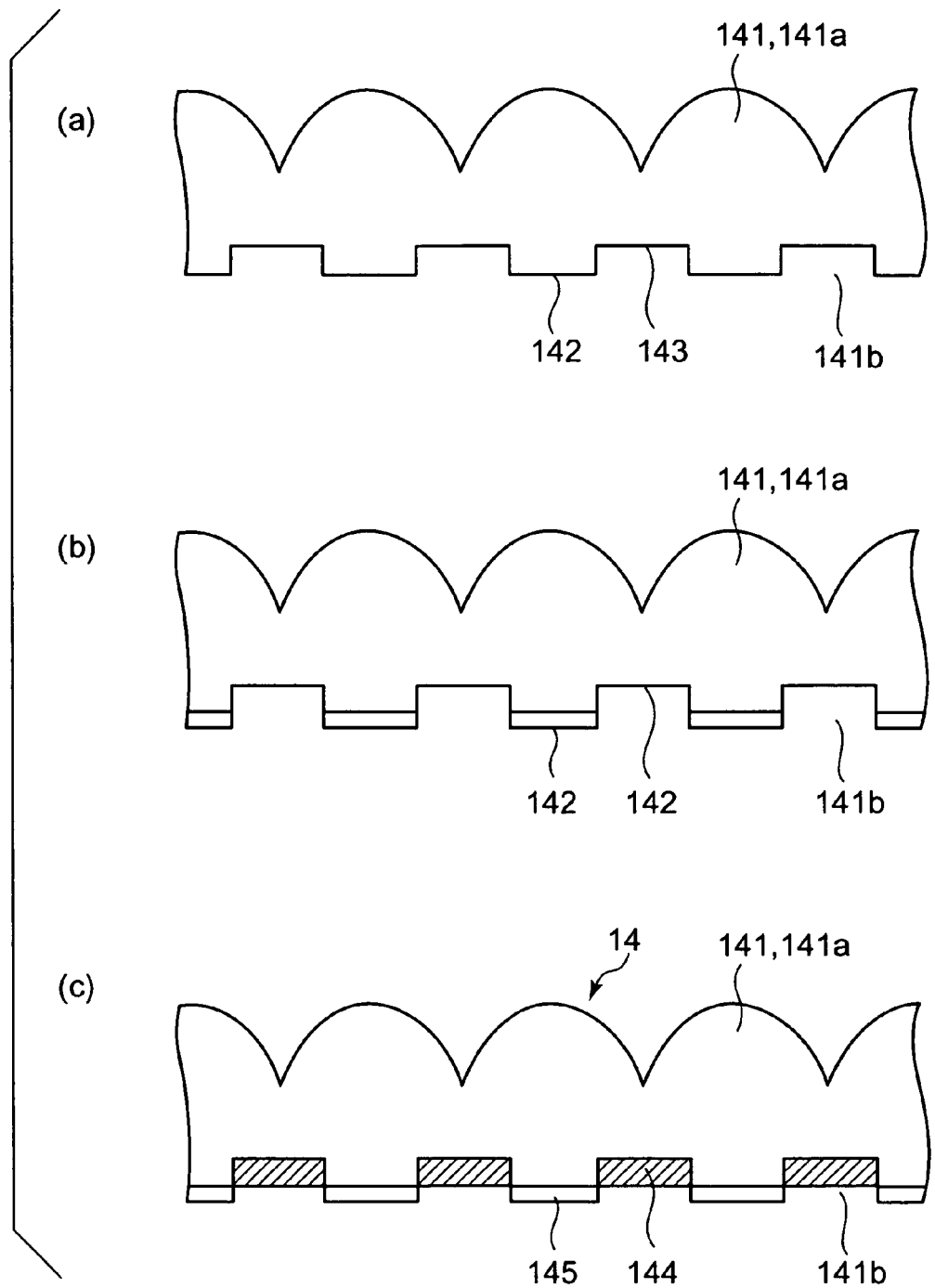
FIGS. 20(a), 20(b) and 20(c) are diagrams respectively showing another example of the method of forming a reflecting layer.

FIGS. 20(a), 20(b) and 20(c) are diagrams illustrating another example of the method for forming the reflecting layers 144.

The method of forming the reflecting layers 144 shown in FIGS. 20(a), 20(b) and 20(c) does not use squeezing. First, a sheet having only a shape corresponding to the light controlling sheet 14 before forming the reflecting layers 144 (FIG. 20(a)) is molded. Next, water-repellent layers 145 for repelling ink are formed only on faces (most projecting faces), parallel to the sheet surfaces, of the convex portions 142. The formation (selective coating) of the water-repellent layers 145 can be readily performed because each convex portion is projecting (FIG. 20(b)). Finally, the whole surface of the sheet is dipped in ink for forming the reflecting layers, and then drawn up untouched. As a result, the ink is not left on the portions at which the water-repellent layers 145 are formed while being left only on the concave portions 143. For exhibiting the water-repellent property, fluororesin-type ink may be used.

As the water-repellent property necessary for the water-repellent layers 145, a water-repellent property exhibiting a contact angle, to water, of 60 degrees or greater is preferable. The method of assessing the contact angle to water was performed in accordance with the static drop method described in the wettability test of glass substrate surfaces provided in JIS R3257.

In this way, by squeezing or providing the water-repellent layers 145, the formation of the reflecting layers 144 can be carried out with ease. Since the thickness of the reflecting layers 144 can be controlled depending on the depth of the concave portions 143, the thickness of each reflecting layer 144 can be readily increased, thereby enhancing the reflectance of the reflecting layers 144 with ease. The reflectance of the reflecting layers depends on the thickness of the layers. Therefore, in the case of forming the reflecting layers 144 by printing, the printing must be repeated several times to several tens of times in order to ensure a sufficiently high reflectance, thus being impractical. As in this example, however, by forming the reflecting layer 144 in each concave portion 143, an adequately higher reflectance can be ensured with ease.

Figure 21:
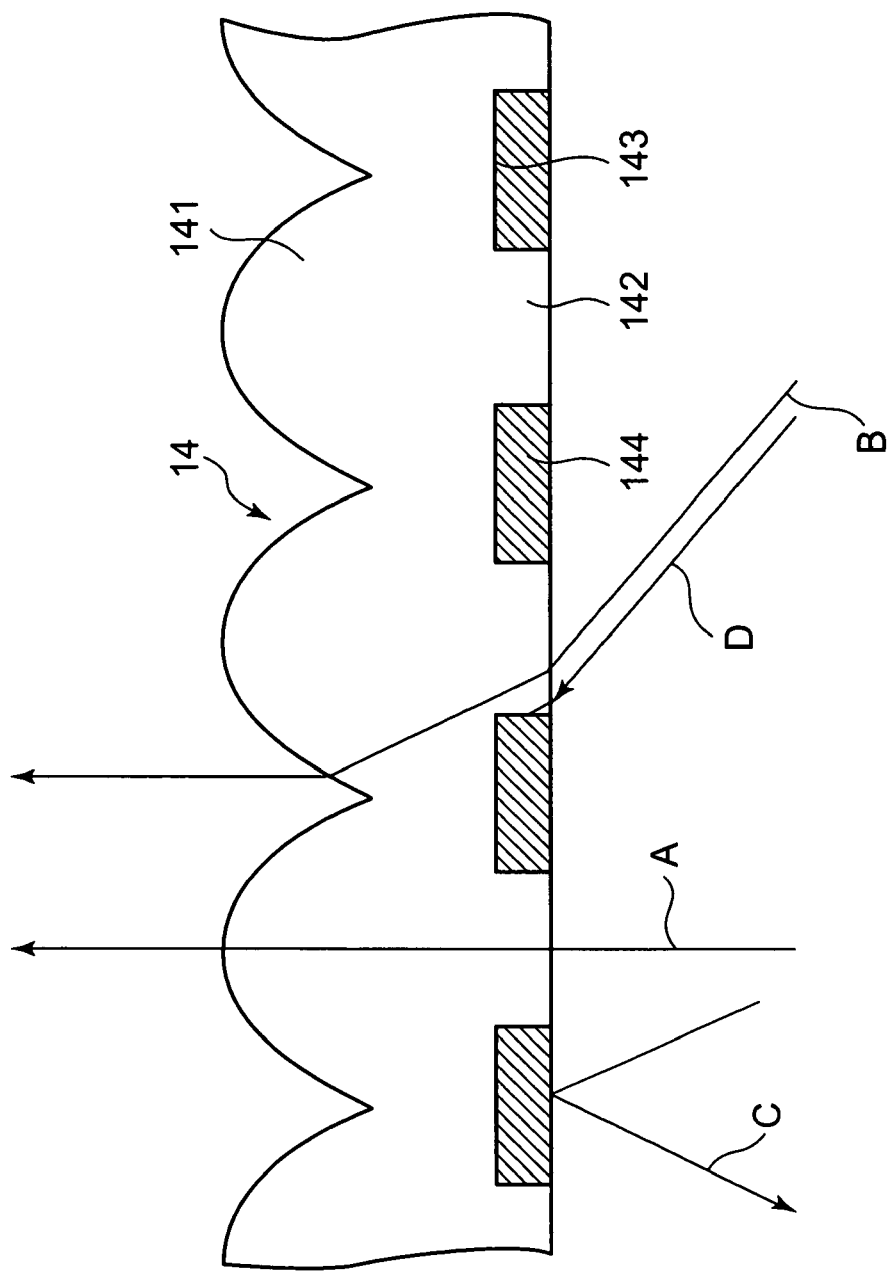
FIG. 21 is a diagram illustrating ways of travel of light which comes in a light controlling sheet.

FIG. 21 is a diagram illustrating ways of travel of light which comes in a light controlling sheet 14.

As illustrated by using light A and light B, light which comes in the convex portions 142 will come out at a smaller outgoing angle (in a direction nearer to the direction of the normal line relative to the sheet surface).

Meanwhile, as is shown by light C, light which reaches a reflecting layer 144 is reflected by the reflecting layer 144 and returned to the light source side for reutilization.

As illustrated by light D, light which comes in a side face of a reflecting layer 144 may be reflected in an unnecessary direction. This phenomenon may tend to occur as the thickness of the reflecting layer 144 is increased. Therefore, in the case where undesired effect can be caused by such light D, the width of each concave portion on the outgoing light side may be narrowed as compared with the width on the incident light side.

FIGS. 22(a) and 22(b) are diagrams respectively showing examples of light controlling sheets having concave portions in each of which the width on the outgoing light side is narrower than the width on the incident light side.

The example illustrated in FIG. 22(a) is a light controlling sheet 14A in which reflecting layers 144A are respectively formed in the concave portions each having a cross section of a substantially half shape of an elliptical cylinder.

The example illustrated in FIG. 22(b) is a light controlling sheet 14B in which reflecting layers 144B are respectively formed in the concave portions each having a cross second of a substantially trapezoidal shape.

Figure 22:
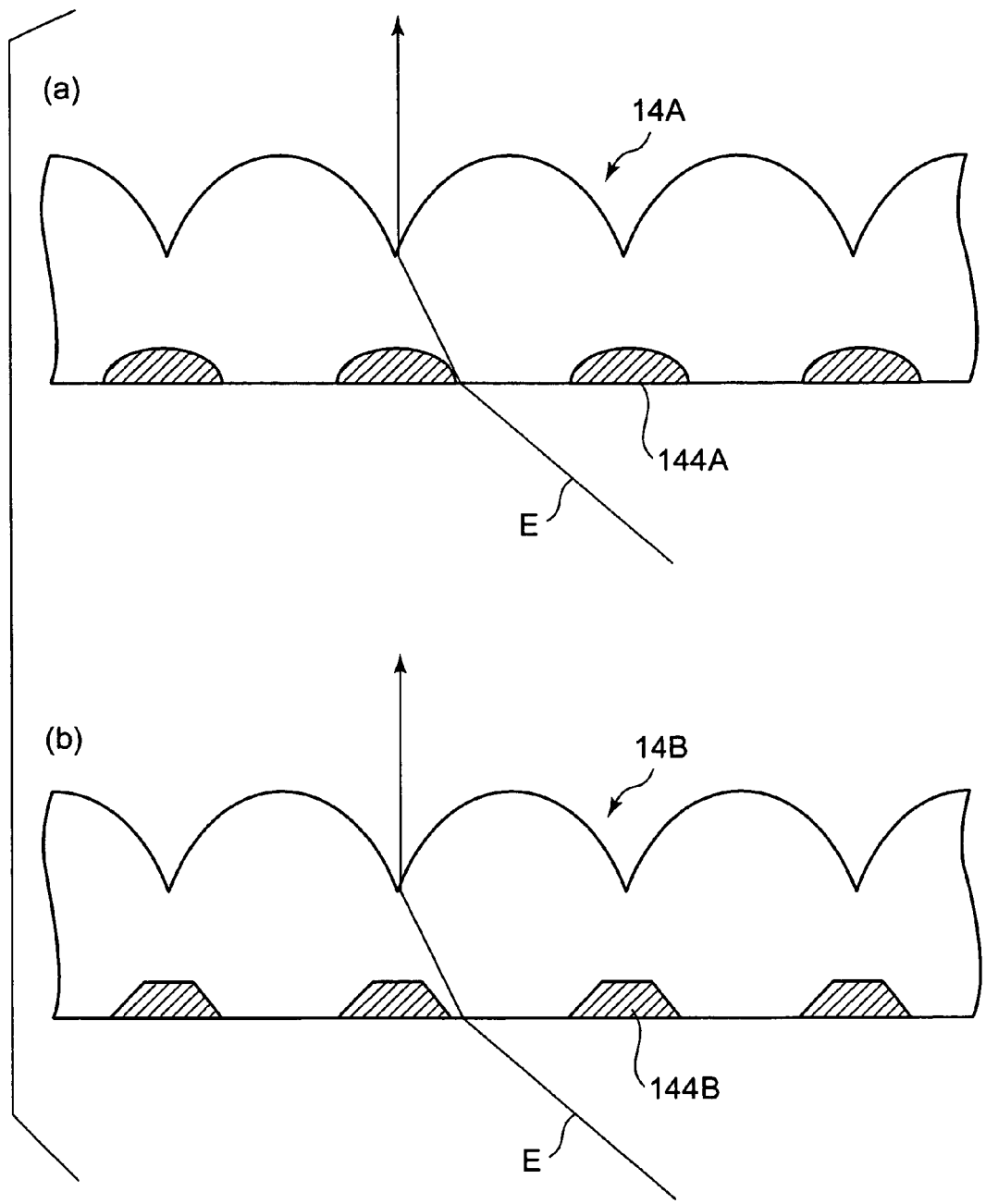
FIGS. 22(a) and 22(b) are diagrams respectively showing examples of light controlling sheets having concave portions in each of which the width on the outgoing light side is narrower than the width on the incident light side.

As shown in FIGS. 22(*a*) and 22(*b*), by narrowing the width on the outgoing light side of each concave portion as compared to the width on the incident light side, even light such as light E or light F coming in a portion in the proximity of a reflecting layer 144A or 144B comes out from the sheet without impinging on a side face of the reflecting layer 144A or 144B.

(Variations)

Without being limited to the examples described above, various variations and modifications are possible to be made, and they are also within equivalent of the present invention.

(1) In this example, while an example of the surface light source device in which linear light sources are arranged in parallel has been illustrated and described, the example is not limited to this aspect, but may be a surface light source device employing point light sources.

(2) In this example, while an example of the controlling sheet wherein one sort of unit lenses are arranged on the outgoing light side has been described, the example is not limited to this aspect. For instance, many kinds of unit lenses may be arranged in combination on the outgoing light side.

(3) In this example, while an example in which a single light controlling sheet is arranged such that light can be controlled in the vertical direction has been described. The example is not limited to this aspect. For instance, another light controlling sheet which is similar to the light controlling sheet for controlling light in the vertical direction may be further provided so as to control light also in the horizontal or left to right direction.

According to the present invention, the following effects can be obtained.

(1) Since an apex of each unit lens and a central portion of each corresponding convex portion are arranged at positions such that they are aligned with each other when viewed along the normal line direction relative to the sheet surface, and a reflecting layer is formed on each concave portion, illuminating light can be condensed efficiently into a desired area, as well as, the productivity can be significantly enhanced.

(2) Due to diffusion reflection of light by the reflecting layers, the utilization ratio of light can be enhanced, as well as, the need of providing any additional element, such as an overcoat can be eliminated, thus improving the productivity.

(3) Since the depth of each concave portion from each convex portion is within the range of from 5 µm to 60 µm, the formation of the reflecting layers can be facilitated. Additionally, since the thickness of each reflecting layer can be readily increased, reflecting layers having a higher reflectance can be formed with ease.

(4) Since the unit lenses, convex portions and concave portions are integrally molded, thus enhancing the productivity, and also improving the resistance to changes of environment.

(5) In each concave portion, the width on the outgoing light side is narrower than the width on the incident light side. Thus, even light which comes in a convex portion in the proximity of a reflecting layer comes out from the sheet without impinging on a side face of the reflecting layer, thereby condensing light with higher efficiency.

(6) Since a water-repellent layer is provided in each convex portion. The reflecting layers can be provided only in the concave portions without employing squeezing or the like.

Fifth Embodiment

This embodiment is made by adding features which will be described below to the first embodiment shown in FIGS. 1 through 6, and the other parts of this embodiment are substantially the same as those in the first embodiment.

Also, the area that the transparent portions on the incident light side comprise relative to the whole surface of the light controlling sheet is substantially the same as that in the first embodiment.

According to this embodiment, the principal objects to condense illuminating light into a desired area with high efficiency, enhance resistance to changes of environment and improve the productivity can be achieved by forming the shape on the incident light side into a concavo-convex shape and forming each convex portion into a curved face.

Example

FIG. 17 is a diagram showing one example of a transmission-type display device including a surface light source device according to the present invention.

It is noted that the drawings described below, including FIG. 17, respectively show typical expressions, and hence emphasize, appropriately, sizes and/or shapes of respective portions in order to facilitate understanding.

A transmission-type display device 10 according to this example comprises an LCD (Liquid Crystal Display) panel 11, a reflecting plate 12, emission tubes 13, a light controlling sheet 14, and an opal plate 16, wherein image information to be formed on the LCD panel 11 is displayed by illumination provided from the back side. A surface light source device 10*a* adapted to illuminate the LCD panel 11 from the back side is composed of the reflecting plate 12, emission tubes 13, light controlling sheet 14 and opal plate 16.

The LCD panel 11 is formed of a transmission-type liquid crystal display element, which has a 30-inch size and is adapted for 800×600 dot display. For the LCD panel 11, the direction along the longitudinal direction of the emission tubes 13 is regarded as the horizontal direction while the direction along which the emission tubes are arranged is regarded as the vertical direction.

The emission tubes 13 are cold-cathode tubes of a linear light source type for forming a light source 13*a* of the back light 10*a*. In this example, six emission tubes 13 are arranged in parallel at an approximately 75 mm equal interval. On the back side of the emission tubes 13, a reflecting plate 12 is provided.

The reflecting plate 12 is provided over the whole surface (back side) of the emission tubes 13 opposite to the light controlling sheet 14, and is adapted to reflect illuminating light traveling toward the back face side, by diffuse reflection, and direct it toward the light controlling sheet 14 (in the outgoing direction), thus approximating the illuminance of the incident light to a uniformed state.

The opal plate 16 is a diffusion plate having a non-directional light diffusing property, and is disposed on the light source side of the light controlling sheet 14.

FIG. 18 is a perspective view showing the light controlling sheet 14.

The light controlling sheet 14 has a sheet surface 14S, which is a lens sheet adapted to reduce and uniformalize uneven brightness of light emitted from the emission tubes 13 so as to condense the outgoing light into a desired range of the outgoing angle. The light controlling sheet 14 is provided on the outgoing light side, and comprises an outgoing light side lens portion 141*a* including multiple unit lenses 141 adapted to condense and radiate light, and transparent portions 142 and reflecting portions 144 both provided on the incident light side. Each unit lens 141 has a shape constituting a part of continuous elliptical cylinders. In the surface on the outgoing light side of the light controlling sheet 14, the unit lenses 141 are arranged in parallel with one another in large numbers. The direction along which the unit lenses 141 are arranged is coincident with the direction along which the emission tubes 13 are arranged (see FIG. 17).

The light controlling sheet 14 of this example is integrally molded by extrusion molding, using a clear PMMA resin (Polymethyl Methacrylate: acryl resin) having a refractive index of 1.49.

In this way, the shaping on both sides at the same time utilizing the extrusion method for molding the light controlling sheet 14 can enhance the productivity. Since both the incident light side and outgoing light side of the light controlling sheet 14 are formed with the same material, the water absorption and/or coefficient of linear expansion becomes equal. Thus, even under changes of temperature and humidity, both the incident light side and outgoing light side will exhibit the same behavior. Therefore, there will be no occurrence of conspicuous deformation or warp only on one side, thereby enhancing resistance to changes of environment.

It should be noted that the light controlling sheet 14 is not limited to the PMMA resin, and other thermoplastic resins having proper optical transparency may be optionally selected and used. Alternatively, the light controlling sheet 14 may be produced by a method called ultraviolet-ray molding, which employs an ultraviolet-ray curable resin.

FIG. 23 is a cross section of the light controlling sheet 14 taken along line S1-S2 designated by arrows in FIG. 18. In FIG. 23, the upper side depicts the outgoing light side.

As shown in the cross section of FIG. 23, each unit lens 141 is formed of a part of elliptical cylinder shape which has a semi-major axis of 400 µm and a semi-minor axis of 200 µm, and arranged with a pitch of 300 µm, with the major axis being orthogonal to the sheet surface of the light controlling sheet 14.

On the incident light side of the light controlling sheet 14, concavo-convex portions 141b are formed, comprising multiple convex portions 142 and concave portions 143 each interposed between each adjacent pair of the convex portions 142. In each of the concave portions 143, a reflecting portion 144 is provided, while each convex portion 142 constitutes a transparent portion adapted to transmit light.

Each convex portion 142 is arranged with a width of 150 µm at a position such that the center of the convex portion 142 is aligned with an apex of a unit lens 141 when viewed from the normal line direction to the sheet surface 14S. The curved shape of each convex portion 142 of this example constitutes a part of an elliptical cylinder portion having a semi-major axis of 100 µm and a semi-minor axis of 50 µm, with the major axis being parallel to the sheet surface of the light controlling sheet 14.

Each concave portion 143 is provided such that it has a depth, measured at a portion interposed between each adjacent pair of convex portions 142, from an apex of the convex portions 142 excluding the reflecting layers 144 to a bottom face of the concave portion 143 becomes 50 µm, and its width is 150 µm.

The thickness of the light controlling sheet 14 is 350 µm.

It is preferred that the depth of the concave portions 143 as measured from a most projecting position (apex) of each convex portion 142 excluding the reflecting layer 144 is in the range of 5 µm≦T≦60 µm. The lower limit of the depth D (5 µm) is determined from a limit value which enables the formation of reflecting layers 144 described below. The upper limit of the depth D (60 µm) is determined to avoid blocking necessary light coming in an incident light face of each convex portion 142, making the viewing angle narrower, and causing poor ink drying ability and degradation of the productivity.

The reflecting layers 144 are formed in the concave portions 143, respectively, so as to form diffusion reflecting surfaces for reflecting illuminating light by diffusion reflection. Each reflecting layer 144 of this example is formed by leaving white color ink containing titanium oxide as a pigment only in the respective concave portions 143 but not leaving it on the convex portions 142. When using the white color ink, light which is not reflected will be transmitted by diffusion, thus the utilization efficiency of light can be enhanced.

However, for the reflecting portions 144, if employing reflecting surfaces formed from aluminum or silver rather than using the diffusion reflecting surfaces formed with white color ink or the like, some amount of light will be absorbed, thus degrading the utilization efficiency of light. Also, if employing such metals, blackening or deterioration of reflectance may occur due to oxidization, thus an overcoat or the like must be required to prevent such phenomena, leading to increase of the production cost. Accordingly, it is preferred that the reflecting portions 144 are composed of diffusion reflecting surfaces formed with white color ink or the like.

In order to leave the white color ink only in the concave portions 143 without leaving it on the surfaces of the convex portions 142 upon forming the reflecting layers 144, squeezing (wiping) may be used after coating the white color ink on the whole surface on the incident light side of the light controlling sheet 14.

Figure 24:
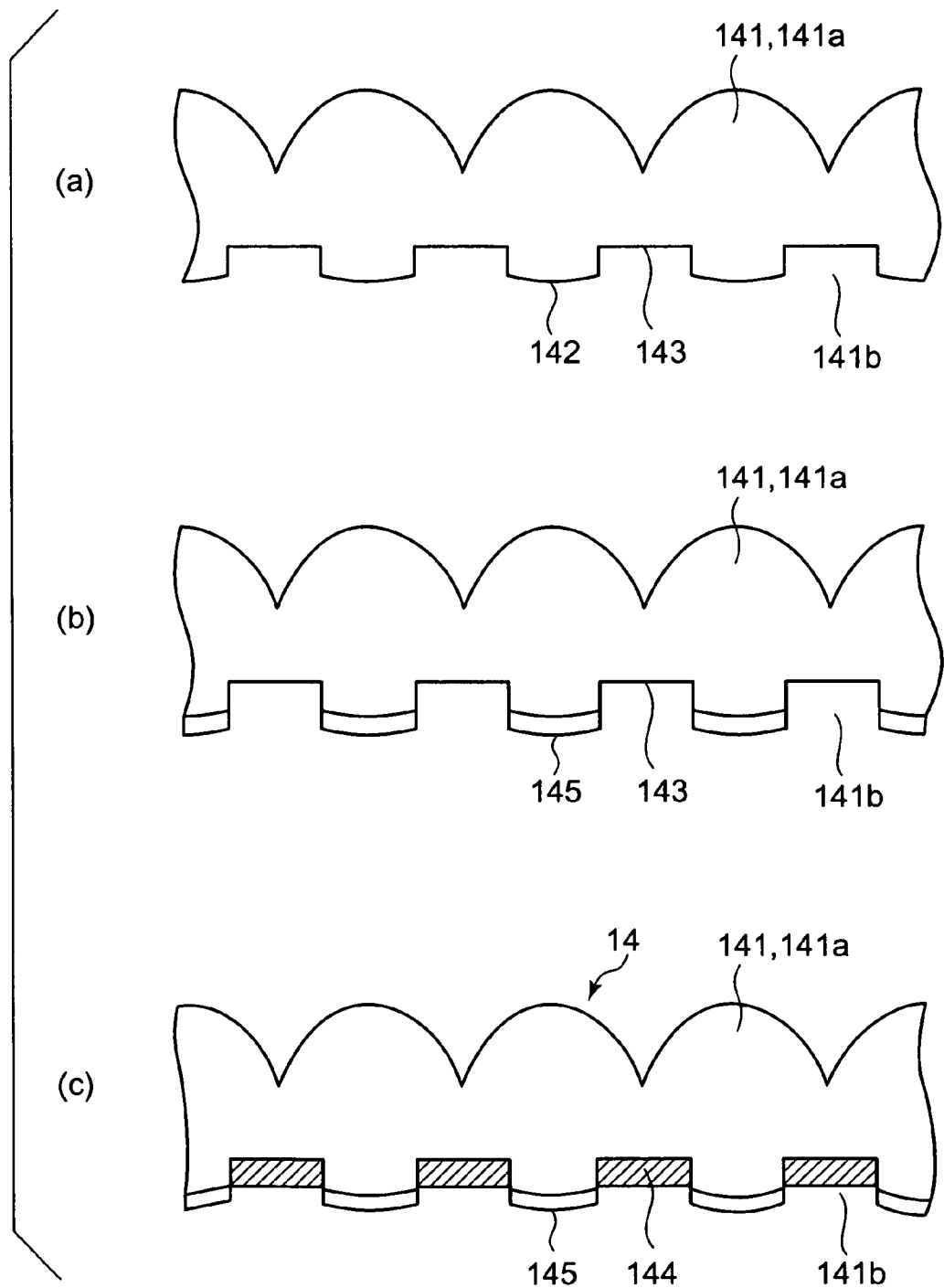
FIGS. 24(a), 24(b) and 24(c) are diagrams respectively showing another example of the method of forming a reflecting layer.

FIGS. 24(a), 24(b) and 24(c) are diagrams illustrating another example of the method for forming the reflecting layers 144.

The method of forming the reflecting layers 144 shown in FIGS. 24(a), 24(b) and 24(c) does not use squeezing. First, a sheet having only a shape corresponding to the light controlling sheet 14 before forming the reflecting layers 144 (FIG. 24(a)) is molded. Next, water-repellent layers 145 for repelling ink are formed only on faces (most projecting faces) parallel to the sheet surface, of the convex portions 142. The formation (selective coating) of the water-repellent layers 145 can be readily performed because each convex portion is projecting (FIG. 24(b)). Finally, the whole surface of the sheet is dipped in ink for forming the reflecting layers, and then drawn up untouched. As a result, the ink is not left on the portions at which the water-repellent layers 145 are formed while being left only on the concave portions. For exhibiting the water-repellent property, fluororesin-type ink may be used.

As the water-repellent property necessary for the water-repellent layers 145, a water-repellent property exhibiting a contact angle, to water, of 60 degrees or greater is preferable. The method of assessing the contact angle to water was performed in accordance with the static drop method described in the wettability test of glass substrate surfaces provided in JIS R3257.

In this way, by squeezing or providing the water-repellent layers 145, the formation of the reflecting layers 144 can be carried out with ease. Since the thickness of the reflecting layers 144 can be controlled depending on the depth of the concave portions 143, the thickness of each reflecting layer 144 can be readily increased, thereby enhancing the reflectance of the reflecting layers 144 with ease. The reflectance of the reflecting layers depends on the thickness of the layers. Therefore, in the case of forming the reflecting layers 144 by printing, the printing must be repeated several times to several tens of times in order to ensure an adequately high reflectance, thus being impractical. As explained in this example, however, by forming the reflecting layer 144 in each concave portion 143, a properly higher reflectance can be ensured with ease.

Now, in order to explain the reason for providing a curved shape for each convex portion 142 projecting toward the incident light side, a comparative example including convex portions 142 each having a flat face parallel to the sheet surface rather than having a curved shape will be described.

Figure 25:
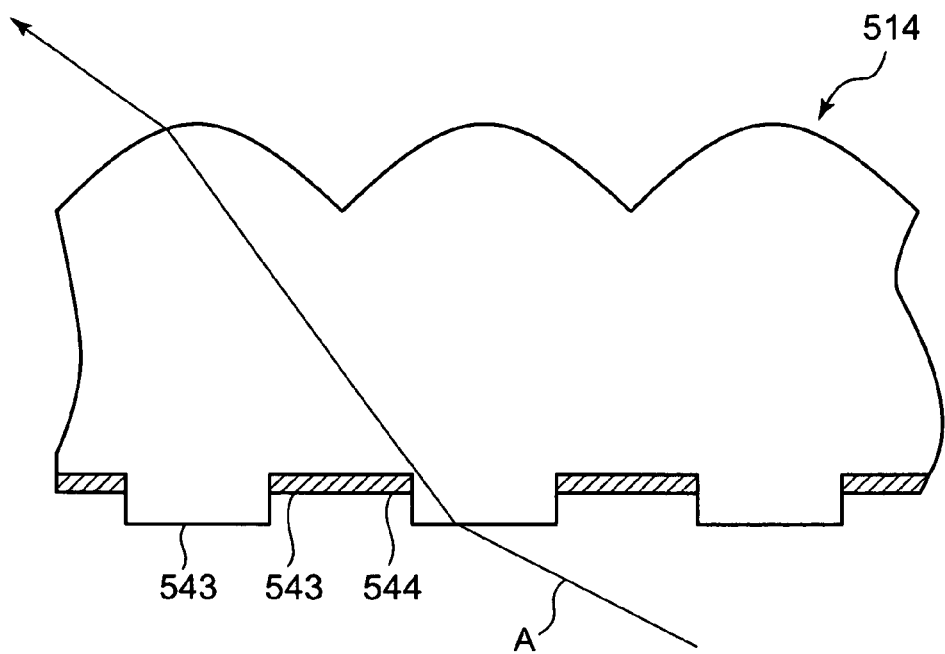
FIG. 25 is a diagram illustrating a way of travel of light which comes in a light controlling sheet of a comparative example.

FIG. 25 is a diagram illustrating a way of travel of light which comes in a light controlling sheet 514 of a comparative example.

The comparative example illustrated in FIG. 25 is different from the light controlling sheet 14 of this embodiment in that the concave portions have flat faces. The other parts, however, are the same as those in the sheet 14 of this embodiment.

In the case where each convex portion 542 is formed into a flat face, light which comes in a convex portion 542 at a large incident angle as is shown by light A will not reach a unit lens which is located at a position that the light would reach if it could travel along the normal line relative to the sheet surface from that convex portion 542, but reach an adjacent unit lens. Thus the light comes out from the unit lens with a larger outgoing angle than expected and desired. In order to reduce the amount of light which comes out from such an adjacent unit lens as shown by light A, reduction of the sheet thickness is effective. If attempting to reduce the sheet thickness, however, the production will be significantly difficult, and also, the resistance to changes of environment will be deteriorated. Hence, in the light controlling sheet 14 of this example, in order to substantially eliminate the light traveling along such a direction as shown by light A, rather than reducing the thickness of the sheet, each convex portion 142 is formed into a curved shape projecting toward the incident light side.

Figure 26:
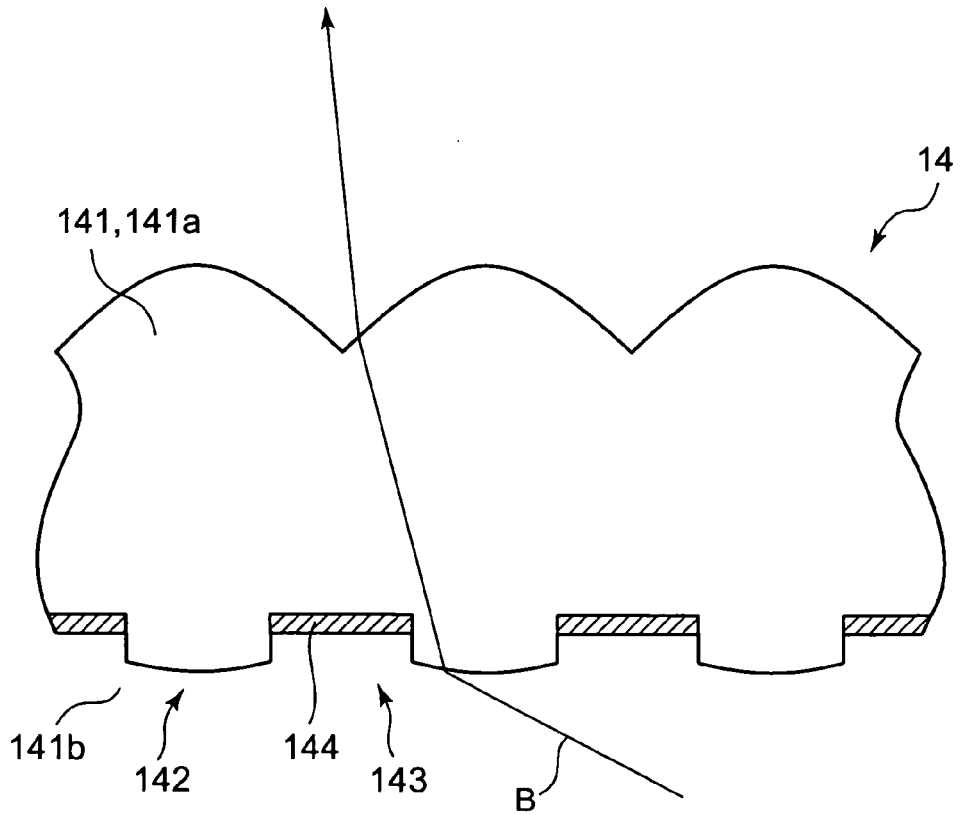
FIG. 26 is a diagram illustrating a way of travel of light which comes in the light controlling sheet of this embodiment.

FIG. 26 is a diagram illustrating a way of travel of light which comes in the light controlling sheet 14 of this example.

Light B comes in the sheet 14 at the same incident angle as that of light A shown in FIG. 25. However, since each convex portion 142 is of a curved shape projecting toward the incident light side, the direction along which the incident light travels in the light controlling sheet 14 is changed, as such the light resultantly comes out from a unit lens 141 located at a position that the light will reach if it can travel along the normal line relative to the sheet surface 14S from the convex portion 142 which it comes in. Accordingly, the outgoing angle of the light becomes smaller, thereby condensing the light with higher efficiency.

The curved shape of each convex portion 142 of the light controlling sheet 14 of this example constitutes a part of an elliptical cylinder portion, with the major axis being parallel to the sheet surface 14S of the light controlling sheet 14. This is because it is preferable that the curved shape around a central portion of each convex portion 142 is a more flattened or parallel shape relative to the sheet surface 14S for reducing or substantially eliminating the influence on light coming in the central portion of the convex portion. In addition, it is preferred that the curvature becomes larger at a point of the concave potion 143 closer to an adjacent concave portion 143 so as to reduce light which comes out along unnecessary directions while increasing light to be condensed along necessary directions. In other words, it is preferred that the curved shape of each convex portion 142 has a smaller angle defined between a tangent obtained around a central portion of the curve and the sheet surface 14S while having a larger angle defined between a tangent obtained at a point of the curve closer to an adjacent concave portion 143 and the sheet surface 14S. Accordingly, such a curved shape of each convex portion 142 is not limited to an elliptical cylinder, but may have a curved face which is flat and parallel, relative to the sheet surface 14S, around its central portion but extending toward the incident light side in the vicinity of both ends.

Figure 27:
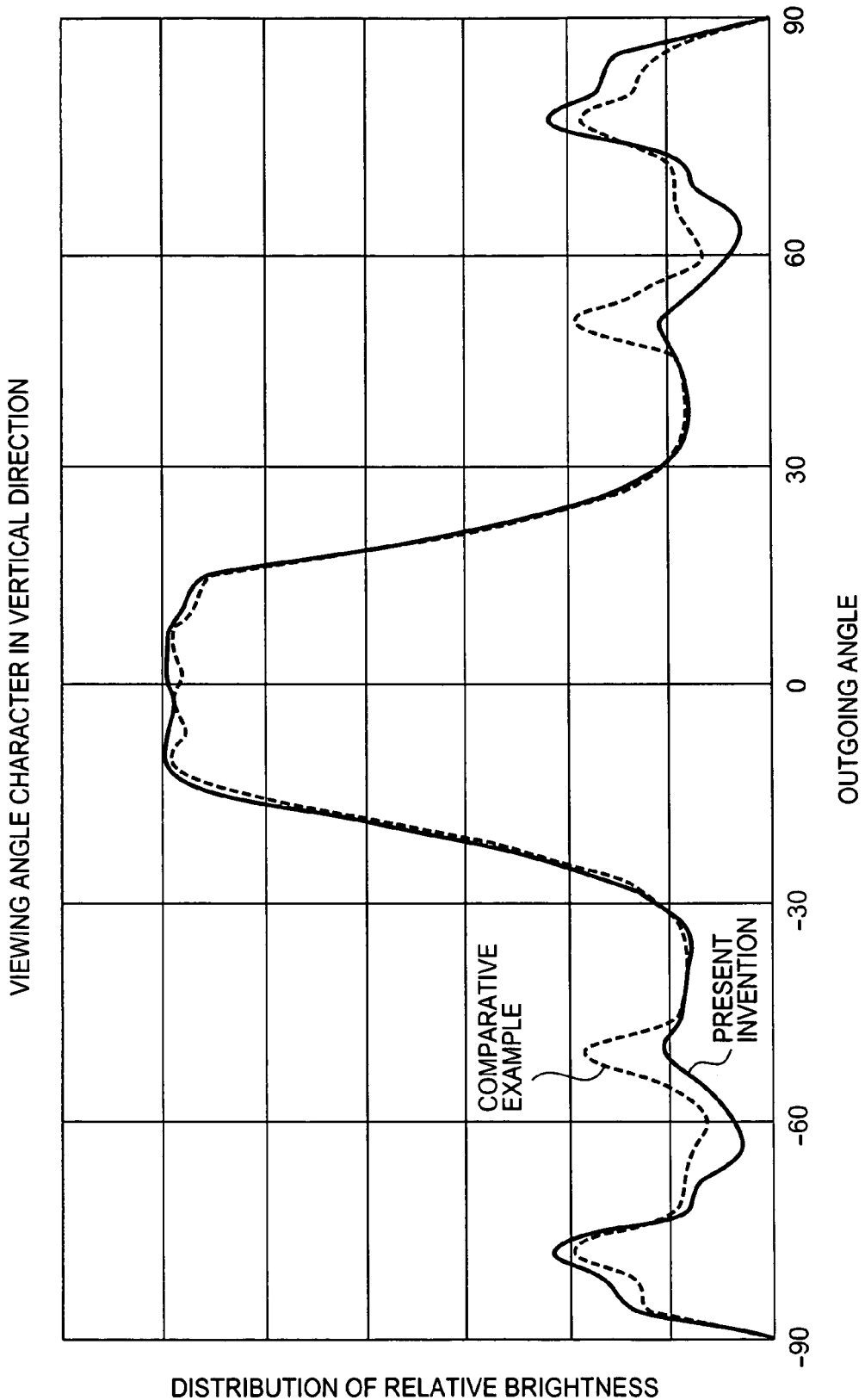
FIG. 27 is a graph showing distribution of brightness in the vertical direction of the light controlling sheet of this embodiment and a similar sheet of a comparative example.

FIG. 27 is a graph showing distribution of brightness in the vertical direction of the light controlling sheet 14 of this example and the comparative light controlling sheet 514. The brightness shown in FIG. 27 is expressed as a ratio (relative brightness) relative to a reference value which is defined as brightness measured at an outgoing angle of 0 degree for the comparative light controlling sheet 514.

In the comparative light controlling sheet 514, there are unnecessary peaks of brightness at outgoing angles around ±50 degrees, while in the light controlling sheet 14 of this example, this problem is dissolved. In addition, due to the light controlling sheet 14, since the light coming out along such unnecessary directions (directions defining relatively large outgoing angles) tends to be condensed into directions defining relatively small outgoing angles, the brightness at outgoing angles around 0 degree can also be enhanced.

According to this example, since the unit lenses 141 are arranged on the outgoing light side while the reflecting portions 144 adapted to perform diffuse reflection are provided on the incident light side, illuminating light can be condensed into a desired area with high efficiency without generating Newton rings even though being superimposed on the opal plate 16.

In addition, since the light controlling sheet 14 is integrally molded using the same material, and the surface areas of the sheet 14 both on the incident light side and on the outgoing light side are substantially the same by providing a concavo-convex shape, such as lens shapes, on both the surfaces, excellent resistance to changes of environment can be realized. Furthermore, since the light controlling sheet 14 is integrally molded by extrusion molding and the reflecting portions 144 are formed on the convex portions 142 by printing, the productivity can be improved.

Since the shape of each convex portion 142 includes a curved face projecting toward the incident light side, unnatural brightness peaks occurring due to light coming out at relatively large outgoing angles can be reduced, while light coming out into a desired area can be increased.

(Variations)

Without being limited to the examples described above, various variations and modifications are possible to be made, and they are also within equivalent of the present invention.

(1) In this example, while an example of the surface light source device in which linear light sources are arranged in parallel has been illustrated and described, the example is not limited to this aspect, but may be a surface light source device employing point light sources.

(2) In this example, while an example of the controlling sheet wherein one sort of unit lenses are arranged on the outgoing light side has been described, the example is not limited to this aspect. For instance, many kinds of unit lenses may be arranged in combination on the outgoing light side.

(3) In this example, while an example in which a single light controlling sheet is arranged such that light can be controlled in the vertical direction has been described. The example is not limited to this aspect. For instance, another light controlling sheet which is similar to the light controlling sheet for controlling light in the vertical direction may be further provided so as to control light also in the horizontal or left to right direction.

(4) In this example, when deformation of the light controlling sheet due to effect of the water absorbing property or heat transferring ability is problematic, and in the case where the surface area on the incident light side is designated as Si and the surface area on the outgoing light side is So, it is preferred that the relationship of 0.8<Si/So<1.2 can be satisfied. Satisfying the above relationship can translate into the fact that the surface area on the incident light side and that on the outgoing light side to be subjected to effect of the moisture absorbing property or thermal conductivity are substantially the same. Accordingly, even though there are some changes in temperature and/or humidity, the incident light side and the outgoing light side will experience substantially the same effect, and hence there will be no occurrence of marked deformation or warp only on one side, thereby enhancing resistance to changes of environment. For example, the assessment of the surface areas may be performed by comparing the shapes expressed in a cross section as shown in FIG. 23.

According to the present invention, the following effects can be obtained.

(1) Since an apex of each unit lens and a central portion of each corresponding convex portion are arranged at positions such that they are aligned with each other when viewed along the normal line direction relative to the sheet surface, and a reflecting layer is formed in each concave portion and each convex portion includes a curved face projecting toward the incident light side, illuminating light can be condensed efficiently into a desired area without generating Newton rings, as well as, the productivity can be significantly enhanced. In addition, light which comes out along unnecessary directions can be reduced, while light coming out along desired directions can be condensed in a greater amount.

(2) Since the curved shape of each convex portion has a smaller angle defined between a tangent obtained around a central portion of the curve and the sheet surface while having a larger angle defined between a tangent obtained at a point of the curve closer to an adjacent concave portion and the sheet surface, light coming out along unnecessary directions can be reduced without affecting light coming in a portion in the vicinity of the central portion of the concave portion, thereby condensing light along desired directions in a greater amount.

(3) Since the curved shape of each convex portion is a part of an elliptical cylinder, light coming out along unnecessary directions can be reduced without affecting light coming in a portion in the vicinity of the central portion of the concave portion, thereby condensing light along desired directions in a greater amount.

(4) Due to diffusion reflection of light by the reflecting layers, the utilization ratio of light can be enhanced. Additionally since the white color ink used for the diffusion reflection is less susceptible to oxidization, the need of providing any additional element, such as an overcoat can be eliminated, thus improving the productivity.

(5) Since the depth measured from a most projecting point of each convex portion to a bottom face of each concave portion excluding the reflecting layer is within the range of from 5 μm to 60 μm, the formation of the reflecting layers by printing can be facilitated while reducing an amount of light coming out along unnecessary directions.

(6) Since the unit lenses, convex portions and concave portions are integrally molded, the productivity can be enhanced, as well as, the resistance to changes of environment can be improved.

(7) When assuming that the surface area on the incident light side is Si, and the surface area on the outgoing light side is So, the relationship of 0.8<Si/So<1.2 can be satisfied. Thus, the resistance to changes of environment can be improved.

The invention claimed is:

1. A light controlling sheet having a sheet surface provided in a straight-down type surface light source device including a light source portion, the light controlling sheet comprising:
   an outgoing light side lens portion having multiple unit lenses arranged to project toward an outgoing light side;
   transparent portions provided on an incident light side;
   an incident light side lens portion having a lens shape which projects toward the incident light side formed in each transparent portion; and
   reflecting portions comprising areas other than the transparent portions on the incident light side;
   wherein the transparent portions transmit light coming from the light source portion, the reflecting portions reflect light coming from the light source portion, the transparent portions and the reflecting portions are arranged alternately, and the transparent portions comprise 40% to 60% of a total area of the light controlling sheet when viewed from a direction orthogonal to the sheet surface on the incident light side so that the light controlling sheet uniformalizes and/or condenses light coming from the light source portion.

2. The light controlling sheet according to claim 1, wherein when assuming that a pitch of the arrangement of the unit lenses of the outgoing light side lens portion is P, a thickness from the surface of the transparent portions to the apex of the unit lenses of the outgoing light side lens portion is t, and an average refractive index of a material forming the light controlling sheet is n, the following relationship can be satisfied:

$$\sin^{-1}(1/n) \leq \tan^{-1}(P/t).$$

3. The light controlling sheet according to claim 1, wherein each unit lens of the outgoing side lens portion is formed such that the unit lens is a part of an elliptical cylinder whose major axis is orthogonal to the sheet surface, or a part of a spheroid whose major axis is orthogonal to the sheet surface.

4. The light controlling sheet according to claim 3, wherein a semi-major axis of each unit lens of the outgoing side lens portion is in a range of 1.5 times to 3.0 times its semi-minor axis.

5. The light controlling sheet according to claim 1, wherein when assuming that the pitch of the arrangement of the unit lenses of the outgoing light side lens portion is P, the thickness from the surface of the transparent portions to the apex of the unit lenses of the outgoing light side lens portion is t, the average refractive index of the material forming the light controlling sheet is n, an angle defined between a tangent obtained at the lens surface of the incident light side lens portion at one end of each transparent portion and the sheet surface is θ, and an opening ratio which is an area ratio of the transparent portion is R, the following relationship can be satisfied:

$$\sin^{-1}(1/n) - \theta \leq \tan^{-1}\{(2-R) \times 0.5 \times P/(t-h)\}.$$

6. The light controlling sheet according to claim 1, wherein when assuming that the pitch of the arrangement of the unit lenses of the outgoing light side lens portion is P, the thickness from the surface of the transparent portions to the apex of the unit lenses of the outgoing light side lens portion is t, the average refractive index of the material forming the light controlling sheet is n, and the opening ratio which is an area ratio of the transparent portion is R, the following relationship can be satisfied:

$$\sin^{-1}(1/n) \leq \tan^{-1}\{(2-R) \times 0.5 \times P/t\}.$$

7. The light controlling sheet according to claim 1, wherein the reflecting portions project toward the incident light side as compared with the transparent portions.

8. The light controlling sheet according to claim 1, wherein the reflection portions are formed by printing or transferring.

9. The light controlling sheet according to claim 1, wherein the reflecting portions provide diffusion reflection of light.

10. The light controlling sheet according to claim 1, wherein when assuming that the surface area of the incident light side is Si, and the surface area of the outgoing light side is So, the following relationship can be satisfied:

$$0.8 < Si/So < 1.2.$$

11. A light controlling sheet having a sheet surface provided in a straight-down type surface light source device including a light source portion, the light controlling sheet comprising:
an outgoing light side lens portion having multiple unit lenses arranged to project toward an outgoing light side;
transparent portions provided on an incident light side;
a concave-convex shape comprising multiple convex portions and multiple concave portions each being interposed between each adjacent pair of the convex portions provided on the incident light side, so that an apex of each unit lens and a central portion of each corresponding concave portion are located at positions so that they are aligned with each other when viewed from a direction orthogonal to the sheet surface; and
reflecting portions comprising areas other than the transparent portions on the incident light side, formed on each convex portion;
wherein the transparent portions transmit light coming from the light source portion, the reflecting portions reflect light coming from the light source portion, the transparent portions and the reflecting portions are arranged alternately, and the transparent portions comprise 40% to 60% of a total area of the light controlling sheet when viewed from a direction orthogonal to the sheet surface on the incident light side so that the light controlling sheet uniformalizes and/or condenses light coming from the light source portion.

12. The light controlling sheet according to claim 11, wherein a projecting amount of the convex portions from the concave portions is within a range of 5 μm to 60 μm.

13. The light controlling sheet according to claim 11, wherein the unit lenses, the convex portions and the concave portions are integrally formed.

14. The light controlling sheet according to claim 11, wherein
a ridgeline around the boundary between each convex portion and the adjacent concave portion is a gently curved face, and
wherein the reflecting portion is also formed on each curved face at the ridgeline.

15. The light controlling sheet according to claim 11, wherein a shape of each concave portion includes a curved face projecting toward the incident light side.

16. The light controlling sheet according to claim 15, wherein the curved face of each concave portion is formed such that an angle defined between a tangent obtained around its central portion and the sheet surface is a relatively small angle, while an angle defined between a tangent obtained at a position closer to each adjacent convex portion and the sheet surface is a relatively large angle.

17. The light controlling sheet according to claim 15, wherein the curved face of each concave portion is a shape of a part of an elliptical cylinder.

18. The light controlling sheet according to claim 11, wherein an apex of each unit lens and a central portion of each corresponding convex portion are located at positions such that they are aligned with each other when viewed from a direction orthogonal to the sheet surface, and
wherein the reflecting portion is formed on each concave portion.

19. The light controlling sheet according to claim 18, wherein a depth of the concave portions from the convex portions is within a range of 5 μm to 60 μm.

20. The light controlling sheet according to claim 18, wherein a width on the outgoing light side of each concave portion is narrower than a width on the incident light side thereof.

21. The light controlling sheet according to claim 18, wherein
a water-repellent layer is formed on each convex portion.

22. The light controlling sheet according to claim 18, wherein a shape of each convex portion includes a curved face projecting toward the incident light side.

23. The light controlling sheet according to claim 22, wherein the curved face of each convex portion is formed such that an angle defined between a tangent obtained around its central portion and the sheet surface is a relatively small angle, while an angle defined between a tangent obtained at a position closer to the adjacent convex portion and the sheet surface is a relatively large angle.

24. The light controlling sheet according to claim 22, wherein the curved face of each concave portion is a shape of a part of an elliptical cylinder.

25. A surface light source device for illuminating a transmission-type display portion from the back side, the surface light source device comprising:
a light source portion including a plurality of light sources; and
a light controlling sheet comprising
an outgoing light side lens portion having multiple unit lenses arranged to project toward an outgoing light side,
transparent portions provided on an incident light side,
an incident light side lens portion having a lens shape which projects toward the incident light side formed in each transparent portion, and
reflecting portions comprising areas other than the transparent portions on the incident light side;
wherein the transparent portions transmit light coming from the light source portion, the reflecting portions reflect light coming from the light source portion, the transparent portions and the reflecting portions are arranged alternately, and the transparent portions comprise 40% to 60% of a total area of the light controlling sheet when viewed from a direction orthogonal to the sheet surface on the incident light side so that the light controlling sheet uniformalizes and/or condenses light coming from the light source portion.

26. The surface light source device according to claim 25, wherein
the light controlling sheet mainly controls light traveling along the vertical direction on a screen of a transmission-type display portion in use.

27. The surface light source device according to claim 25, further comprising:
   a diffusion sheet having a light diffusing property.

28. The surface light source device according to claim 27, further comprising:
   a second light controlling sheet adapted to mainly control light traveling along a direction orthogonal to the direction along which the light controlling sheet controls light mainly.

29. The surface light source device according to claim 28, wherein
   particles having a light diffusing property are added to at least one of the sheets contained in the surface light source device.

30. The surface light source device according to claim 25, wherein
   a highly rigid sheet having a rigidity higher than that of the light controlling sheet is provided on the light source side of the light controlling sheet.

31. The surface light source device according to claim 30, wherein
   the light controlling sheet is joined at its reflecting portions to the highly rigid sheet.

* * * * *